(12) United States Patent
Kanaya

(10) Patent No.: US 11,559,737 B2
(45) Date of Patent: Jan. 24, 2023

(54) VIDEO MODIFICATION AND TRANSMISSION USING TOKENS

(71) Applicant: GREE, Inc., Tokyo (JP)

(72) Inventor: Yosuke Kanaya, Tokyo (JP)

(73) Assignee: GREE, Inc., Toyko (JP)

( * ) Notice: Subject to any disclaimer, the term of this patent is extended or adjusted under 35 U.S.C. 154(b) by 127 days.

(21) Appl. No.: 17/156,270

(22) Filed: Jan. 22, 2021

(65) Prior Publication Data

US 2021/0220735 A1 Jul. 22, 2021

(30) Foreign Application Priority Data

Jan. 22, 2020 (JP) .............................. JP2020-008589

(51) Int. Cl.
  *A63F 13/46* (2014.01)
  *G06F 9/54* (2006.01)
  *A63F 13/335* (2014.01)
  *A63F 13/44* (2014.01)

(52) U.S. Cl.
  CPC ............ *A63F 13/46* (2014.09); *A63F 13/335* (2014.09); *A63F 13/44* (2014.09); *G06F 9/547* (2013.01)

(58) Field of Classification Search
  CPC ........ A63F 13/46; A63F 13/335; A63F 13/44; G06F 9/547
  See application file for complete search history.

(56) References Cited

U.S. PATENT DOCUMENTS

| | | | | |
|---|---|---|---|---|
| 9,707,474 | B1* | 7/2017 | Cardinale | ................ A63F 13/35 |
| 2008/0001951 | A1* | 1/2008 | Marks | ...................... A63F 13/79 463/31 |
| 2019/0308106 | A1* | 10/2019 | Barnes | .................... A63F 13/35 |
| 2020/0077157 | A1 | 3/2020 | Kurabuchi | |
| 2021/0152894 | A1 | 5/2021 | Kurabuchi | |

FOREIGN PATENT DOCUMENTS

| | | |
|---|---|---|
| JP | 6378849 B1 | 8/2018 |
| JP | 6491388 B1 | 3/2019 |
| JP | 2019-054838 A | 4/2019 |

OTHER PUBLICATIONS

Office Action issued in Japanese patent application No. 2020-008589 (with English translation), dated Dec. 21, 2021, 5 pages.

(Continued)

*Primary Examiner* — Yingchuan Zhang
(74) *Attorney, Agent, or Firm* — Klarquist Sparkman, LLP

(57) ABSTRACT

Methods and apparatus are disclosed for video transmission using tokens. According to one example, computer-readable storage media store instructions that cause a processor to: distribute, toward terminal devices of a plurality of viewers via a communication line, motion data or a first video including an animation of an avatar of a distributor generated on the basis of the motion data; distribute, toward the terminal devices of the plurality of viewer via the communication line, a second video related to a computer-implemented game generated on the basis of operation data by using a received web page; receive, via the communication line, token data indicating that any type of token among a plurality types of tokens is given to the distributor, the token data being generated by the terminal device of each viewer viewing the second video; calculate a score based on the total number of at least one type of tokens given to the distributor using the token data; and control a game object used in the game on the basis of the score.

21 Claims, 26 Drawing Sheets

(56) References Cited

OTHER PUBLICATIONS

"REALITY Avatar" that you can easily debut on VTuber on your smartphone, thorough explanation of how to use it !, MoguLive [online],"(with partial English translation), Nov. 18, 2018, especially "2. Create an account and create an avatar" from: https://www.moguravr.com/reality-avatar-3/ on Jan. 21, 2021.

GAPSIS editorial department, "The games users are able to play by operating their avatars with LINE will be launched," downloaded from https://www.gapsis.jp/2013/05/line-turitomo.html, 7 pp., May 17, 2013 (English translation attached.).

Mirrativ, Inc., "A gift function has been launched!," downloaded from https://web.archive.org/web/20181214025245/https://mirrativtmbr.tumblr.com/post/178631446973/ ギフト機能がはじまります, 8 pp., Dec. 14, 2018 (English translation attached.).

Mirrativ, Inc., "Game distribution & game commentary & game recording," downloaded from https://apps.apple.com/jp/app/mirrativ- ミラティブ - スマホでかんたんゲーム配信/id1028944599, 7 pp., Nov. 10, 2020 (English translation attached.).

Notice of Reasons for Refusal dated Oct. 6, 2020 for Japanese Patent Application No. 2019-166968, 6 pp. (English translation attached.).

Notice of Reasons for Refusal dated Oct. 6, 2020 for Japanese Patent Application No. 2019-166971, 7 pp. (English translation attached.).

Notice of Reasons for Refusal dated Jan. 12, 2021 for Japanese Patent Application No. 2019-202987, 8 pp. (English translation attached.).

REALITY Administration Bureau, "Flappin' Avatar," downloaded from https://reality-notice.wrightflyer.net/aba0a23e90b9c3df9c819fc58bd39f09a0452aac.html, 5 pp., Apr. 1, 2019 (English translation attached.).

* cited by examiner

| Grid | Gift |
|------|------|
| Grid 1 | Gift G5 |
| Grid 2 | Gift G9 |
| Grid 3 | Gift G2 |
| Grid 4 | Gift G4 |
| Grid 5 | Gift G6 |
| Grid 6 | Gift G3 |
| Grid 7 | Gift G7 |
| Grid 8 | Gift G1 |
| Grid 9 | Gift G8 |

FIG. 10

VIDEO MODIFICATION AND TRANSMISSION USING TOKENS

CROSS-REFERENCE TO RELATED APPLICATIONS

This application claims priority to Japanese Patent Application No. 2020-008589, filed on Jan. 22, 2020, entitled "Computer Program, Method, and Server Device." The application is incorporated herein by reference in its entirety as if set forth fully herein.

FIELD

The technology disclosed in the present application relates to a computer program, a method, and a server device that are used for distributing a video related to a game from a terminal device of a distributor to a terminal device of each viewer.

BACKGROUND

As one example of a service used for distributing a video related to a computer game from the terminal device of a distributor to the terminal device of each viewer, a service called mirrativ provided on a website at apps.apple.com is known.

With this service, the distributor uses a terminal device to distribute, to the terminal devices of a plurality of viewers, a video including an animation of an avatar generated on the basis of motion data related to the motion of the distributor.

SUMMARY

Method and apparatus for distributing and modifying video in a networked computer environment are disclosed. In some examples of a video streaming service used with computer games, each viewer can exchange data with a distributor including game metadata, comments, video data, audio data, image data, location data, and/or video or game commands. Each viewer can also determine to transmit one or more messages or packets encoded with one or more tokens to the distributor. In the disclosed technology field, such tokens may also be referred to as elective tokens or "gifts." Similarly, token data may be referred to as "gift data." However, the token data and such token packets transmitted by each viewer to the distributor in this way do not affect elements used in the game played and distributed by the distributor, such as game objects or parameters. Therefore, it is difficult for each viewer to have a sense of being involved in the game when viewing video related to the game distributed from the distributor.

Accordingly, one aspect of the disclosed technology provides a computer program, a terminal device, a server device, and a method that can provide a viewer with a sense of being involved in a game. Methods and apparatus are disclosed for modifying and distributing video in a computer network responsive to transmission of token messages transmitted from one or more viewers to a distributor. The viewers can receive video streams or other game elements having modified encodings based on the tokens the viewers elected to transmit. As will be understood to a person of ordinary skill in the art having the benefit of the present disclosure, viewers can elect to send such tokens to indicate a message to the distributor, for example, appreciation or respect for the distributor. Examples of practical applications of the disclosed technologies include but are not limited to: video encoding and transcoding, audio coding and transcoding, and/or enhancement of computer games implemented in a network environment modified responsive to the distributor receiving the token.

Computer-readable storage media according to one aspect of the disclosed technology can be "computer-readable storage media storing computer-readable instructions, which when executed by a computer having at least one processor, cause the computer to: distribute, toward terminal devices of a plurality of viewers via a communication line, motion data or a first video including an animation of an avatar of a distributor generated on the basis of the motion data; distribute, toward the terminal devices of the plurality of viewer via the communication line, a second video related to a computer-implemented game generated on the basis of operation data by using a received web page; receive, via the communication line, token data indicating that any type of token among a plurality types of tokens is given to the distributor, the token data being generated by the terminal device of each viewer viewing the second video; calculate a score based on the total number of at least one type of tokens given to the distributor using the token data; and control a game object used in the game on the basis of the calculated score."

A terminal device according to one aspect of the disclosed technology can be "a terminal device, comprising: at least one processor, wherein the at least one processor is configured to: distribute, toward terminal devices of a plurality of viewers via a communication line, motion data or a first video including an animation of an avatar of a distributor generated on the basis of the motion data; distribute, toward the terminal devices of the plurality of viewer via the communication line, a second video related to a computer-implemented game generated on the basis of operation data by using a received web page; receive, via the communication line, token data indicating that any type of token among a plurality types of tokens is given to the distributor, the token data being generated by the terminal device of each viewer viewing the second video; calculate a score based on the total number of at least one type of tokens given to the distributor using the token data; and control a game object used in the game on the basis of the calculated score."

A method according to one aspect of the disclosed technology can be "a computer-implemented method for automatically generating customized video in an interactive network application, the method comprising: with at least one processor: distributing, toward terminal devices of a plurality of viewers via a communication line, motion data or a first video including an animation of an avatar of a distributor generated on the basis of the motion data; distributing, toward the terminal devices of the plurality of viewer via the communication line, a second video related to a computer-implemented game generated on the basis of operation data by using a received web page; receiving, via the communication line, token data indicating that any type of token among a plurality types of tokens is given to the distributor, the token data being generated by the terminal device of each viewer viewing the second video; calculating a score based on the total number of at least one type of tokens given to the distributor using the token data; and controlling a game object used in the game on the basis of the calculated score."

Computer-readable storage media according to another aspect of the disclosed technology can be "computer-readable storage media storing computer-readable instructions, which when executed by a computer having at least one processor, cause the computer to: distribute, toward terminal devices of a plurality of viewers via a communication line, motion data or a first video including an animation of an avatar of a distributor generated on the basis of the motion data; distribute, toward the terminal devices of the plurality of viewer via the communication line, a second video related to a computer-implemented game generated on the basis of operation data by using a received web page; receive, from the terminal devices of the plurality of viewer via the communication line, token data indicating that any type of token among a plurality types of tokens is given to the distributor, the token data being generated by the terminal device of each viewer viewing the second video; and receive, from the terminal device of the distributor via the communication line, the second video including a game object controlled by the terminal device of the distributor according to a score based on the total number of at least one type of tokens given to the distributor."

A server device according to one aspect of the disclosed technology can be "a server device, comprising: at least one processor, wherein the at least one processor is configured to: distribute, toward terminal devices of a plurality of viewers via a communication line, motion data or a first video including an animation of an avatar of a distributor generated on the basis of the motion data; distribute, toward the terminal devices of the plurality of viewer via the communication line, a second video related to a computer-implemented game generated on the basis of operation data by using a received web page; receive, from the terminal devices of the plurality of viewer via the communication line, token data indicating that any type of token among a plurality types of tokens is given to the distributor, the token data being generated by the terminal device of each viewer viewing the second video; and receive, from the terminal device of the distributor via the communication line, the second video including a game object controlled by the terminal device of the distributor according to a score based on the total number of at least one type of tokens given to the distributor."

A method according to another aspect of the disclosed technology can be "a computer-implemented method for automatically generating customized video in an interactive network application, the method comprising: with at least one processor: distributing, toward terminal devices of a plurality of viewers via a communication line, motion data or a first video including an animation of an avatar of a distributor generated on the basis of the motion data; distributing, toward the terminal devices of the plurality of viewer via the communication line, a second video related to a computer-implemented game generated on the basis of operation data by using a received web page; receiving, from the terminal devices of the plurality of viewer via the communication line, token data indicating that any type of token among a plurality types of tokens is given to the distributor, the token data being generated by the terminal device of each viewer viewing the second video; receiving, from the terminal device of the distributor via the communication line, the second video including a game object controlled by the terminal device of the distributor according to a score based on the total number of at least one type of tokens given to the distributor."

Computer-readable storage media according to another aspect of the disclosed technology can be "computer-readable storage media storing computer-readable instructions, which when executed by a computer having at least one processor, cause the computer to: receive, from a terminal device of a distributor via a communication line, motion data or a first video including an animation of an avatar of the distributor generated on the basis of the motion data; receive, from the terminal device of the distributor via the communication line, a second video related to a computer-implemented game generated on the basis of operation data by using a received web page; transmit, toward the terminal device of the distributor via the communication line, token data indicating that any type of token among a plurality types of tokens is given to the distributor; and receive, from the terminal device of the distributor via the communication line, the second video including a game object controlled by the terminal device of the distributor according to a score based on the total number of at least one type of tokens given to the distributor."

A terminal device of another aspect of the disclosed technology can be "a terminal device, comprising: at least one processor, wherein the at least one processor is configured to: receive, from a terminal device of a distributor via a communication line, motion data or a first video including an animation of an avatar of the distributor generated on the basis of the motion data; receive, from the terminal device of the distributor via the communication line, a second video related to a computer-implemented game generated on the basis of operation data by using a received web page; transmit, toward the terminal device of the distributor via the communication line, token data indicating that any type of token among a plurality types of tokens is given to the distributor; and receive, from the terminal device of the distributor via the communication line, the second video including a game object controlled by the terminal device of the distributor according to a score based on the total number of at least one type of tokens given to the distributor."

A method according to another aspect of the disclosed technology can be "a computer-implemented method for automatically generating customized video in an interactive network application, the method comprising: with at least one processor: receiving, from a terminal device of a distributor via a communication line, motion data or a first video including an animation of an avatar of the distributor generated on the basis of the motion data; receiving, from the terminal device of the distributor via the communication line, a second video related to a computer-implemented game generated on the basis of operation data by using a received web page; transmitting, toward the terminal device of the distributor via the communication line, token data indicating that any type of token among a plurality types of tokens is given to the distributor; and receiving, from the terminal device of the distributor via the communication line, the second video including a game object controlled by the terminal device of the distributor according to a score based on the total number of at least one type of tokens given to the distributor."

A server device according to another aspect of the disclosed technology can be "a server device, comprising: at least one processor, wherein the at least one processor is configured to transmit, to a terminal device of a distributor via a communication line, a webpage including instructions, wherein the terminal device of the distributor is configured to: distribute, toward terminal devices of a plurality of viewers via the communication line, motion data or a first video including an animation of an avatar of the distributor generated on the basis of the motion data; and distribute, toward the terminal devices of the plurality of viewer via the communication line, a second video related to a computer-implemented game generated on the basis of operation data by using a received web page; wherein the instructions, when executed by a computer having at least one processor of the terminal device of the distributor, cause the computer to: receive, via the communication line, token data indicating that any type of token among a plurality types of tokens is given to the distributor, the token data being generated by the terminal device of each viewer viewing the second video; calculate a score based on the total number of at least one type of tokens given to the distributor using the token data; and control a game object used in the game on the basis of the calculated score."

A method according to another aspect of the disclosed technology can be "a computer-implemented method for automatically generating customized video in an interactive network application, the method comprising: with at least one processor: transmitting, to a terminal device of a distributor via a communication line, a webpage including instructions, wherein the terminal device of the distributor is configured to: distribute, toward terminal devices of a plurality of viewers via the communication line, motion data or a first video including an animation of an avatar of the distributor generated on the basis of the motion data; and distribute, toward the terminal devices of the plurality of viewer via the communication line, a second video related to a computer-implemented game generated on the basis of operation data by using a received web page; wherein the instructions, when executed by a computer having at least one processor of the terminal device of the distributor, cause the computer to: receive, via the communication line, token data indicating that any type of token among a plurality types of tokens is given to the distributor, the token data being generated by the terminal device of each viewer viewing the second video; calculate a score based on the total number of at least one type of tokens given to the distributor using the token data; and control a game object used in the game on the basis of the calculated score."

A system according to one aspect of the disclosed technology can be "a system comprising a first terminal device, second terminal devices and a server device, wherein the first terminal is configured to: distribute, toward the second terminal devices via the server device, motion data or a first video including an animation of an avatar of a distributor generated on the basis of the motion data; and distribute, toward the second terminal devices via the server device, a second video related to a computer-implemented game generated on the basis of operation data by using a received web page, wherein each of the second terminal device is configured to transmit, toward the first terminal device via the server device, token data indicating that any type of token among a plurality types of tokens is given to the distributor, wherein the first terminal device is configured to calculate a score based on the total number of at least one type of tokens given to the distributor using the token data; and control a game object used in the game on the basis of the calculated score, and wherein each of the second terminal devices is configured to receive, from the first terminal device via the server device, the second video including the game object controlled by the first terminal device according to the score."

A method according to another aspect of the disclosed technology can be "a method in a system comprising a first terminal device, second terminal devices and a server, including: the first terminal device distributing, toward the second terminal devices via the server device, motion data or a first video including an animation of an avatar of a distributor generated on the basis of the motion data; the first terminal device distributing, toward the second terminal devices via the server device, a second video related to a computer-implemented game generated on the basis of operation data by using a received web page; each of the second terminal device transmitting, toward the first terminal device via the server device, token data indicating that any type of token among a plurality types of tokens is given to the distributor; the first terminal device calculating a score based on the total number of at least one type of tokens given to the distributor using the token data; the first terminal device controlling a game object used in the game on the basis of the calculated score; and each of the second terminal devices receiving, from the first terminal device via the server device, the second video including the game object controlled by the first terminal device according to the score."

This Summary is provided to introduce a selection of concepts in a simplified form that are further described below in the Detailed Description. All trademarks used herein remain the property of their respective owners. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

BRIEF DESCRIPTION OF THE DRAWINGS

FIG. 10 is a diagram showing an example of the relationship between each grid (each option) and a token assigned to the grid in the game executed by the terminal device 10 used in the video distribution system 1 shown in FIG. 1;

DETAILED DESCRIPTION

Figure 1:
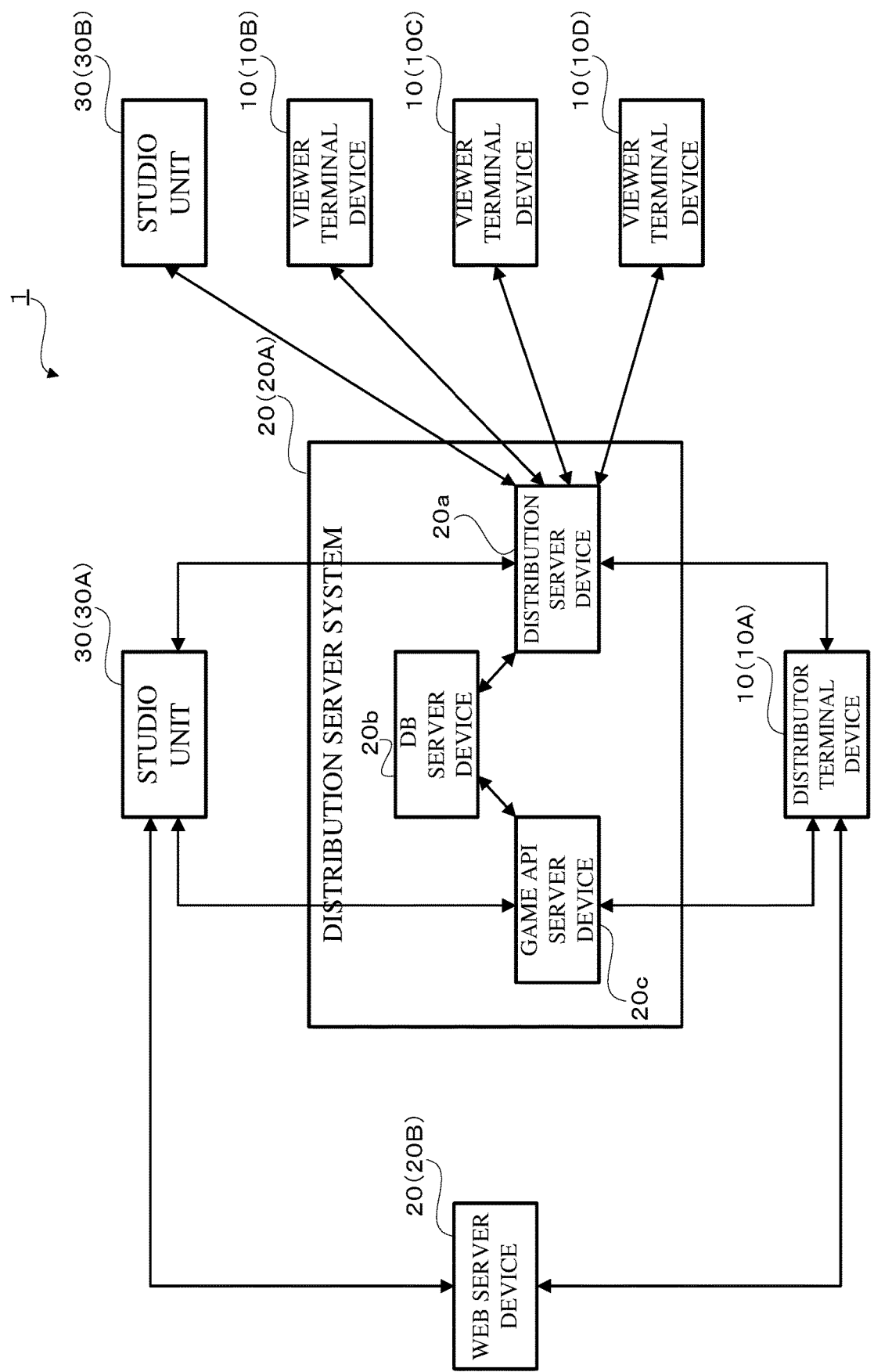
FIG. 1 is a block diagram showing an example of the configuration of the video distribution system according to an embodiment.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," and "distribute" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As will be described in further detail herein, certain examples of the disclosed technology can be used in a networked video transmission system to provide interactive applications, such as games, social media, and other forms of interactive communication. In some examples, token data can be transmitted from a viewer terminal device to a distributor terminal device operating concurrently to provide an interactive application. A server at the distributor, or the distributor terminal device itself, can process the data to render modified video data that is encoded and sent to the viewer terminal device. This allows for interactive applications to be processed at the distributor, which can reduce the amount of computing resources required at the viewer terminal devices to render the modified video data locally. Further, in some examples, the modified video data is transmitted not just to the viewer device that sent token data, but can also be transmitted to other viewer devices participating in the interactive application. This can further reduce computing resources required at each of the additional viewer devices or allow for more extensive effects to be added to the transmitted video. In addition, certain disclosed techniques allow security and maintenance operations associated with interactive applications such as game programs to be performed at the distributor, further reducing complexity of the application.

In the following, various embodiments will be described with reference to the accompanied drawings. Additionally, common elements as shown in drawings are assigned with a same reference sign. Also, it should be noted that there are cases where an element as shown in one drawing is omitted in another drawing for the purposes of explanation. Further, it should be noted that the accompanied drawings are not necessarily described to scale.

1. Configuration of Video Distribution System

Examples of video distribution systems disclosed in the present application enable a user who performs video distribution over a computer network (hereinafter referred to as "distributor") to transmit (or "distribute"), by using a terminal device of the distributor, a first video including an animation of an avatar generated on the basis of motion data generated by motion capture of video or other image data captured of the distributor and a second video related to a computer-implemented game generated on the basis of operation data related to the operation of the distributor to a terminal device of a user who views the videos (hereinafter referred to as "viewer") via a computer network communication line. Transmission via the communication line can include wired and/or wireless forms of signal transmission. In other examples, only the motion data, or both at least a portion of the motion data and the video are transmitted. In such cases, the receiver of the video can generate or modify the video using received motion data.

FIG. 1 is a block diagram showing an example of the configuration of the video distribution system according to an embodiment. As shown in FIG. 1, the video distribution system 1 can include a plurality of terminal devices 10 connected to a communication line (communication network) which is not shown, and one or more server devices 20 connected to a communication line. Each terminal device 10 can be connected to one or more server devices 20 via a communication line.

Additionally, although, for example, terminal devices 10A-10D are shown in FIG. 1 as the plurality of terminal devices 10, one or more terminal devices 10 other than them can be used similarly. Likewise, although, for example, server devices 20A, 20B are shown in FIG. 1 as the plurality of server devices 20, one or more server devices 20 other than them can be used similarly. Additionally, the communication line which is not shown can include a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto.

Further, in one embodiment, the video distribution system 1 can include one or more studio units 30 which can be connected to the communication line. Each studio unit 30 can be connected to one or more server devices 20 or a plurality of terminal devices 10 via the communication line. Additionally, although, for example, studio unit 30A, 30B are shown as the one or more studio units 30 in FIG. 1, one or more studio units 30 other than them can be used similarly. Each studio unit 30 can have the functions which are similar to those of the terminal device 10 or the server device 20, which will be described below.

In the following, for the purposes of easy explanation, discussions focus on the cases where one or more server devices 20 communicate videos and token data, etc. with each terminal device 10. Alternatively or in addition to this, one or more server devices 20 can communicate videos and token data, etc. with each studio unit 30, as will be described below. Further, alternatively or in addition to this, one or more studio units 30 can communicate videos and token data, etc. with each terminal device 10.

1-1. Terminal Device 10

The plurality of terminal devices 10 can include one or more distributor terminal devices 10 (here, a terminal device 10A) and one or more viewer terminal devices 10 (here, a terminal device 10B to a terminal device 10D). Each terminal device 10 can have a common configuration and thus may include a terminal device (distributor terminal device 10) for distributing a video and/or a terminal device (viewer terminal device 10) for viewing a video.

When operating as a terminal device (distributor terminal device) for distributing a video, each terminal device 10 can execute an installed video distribution application (which can be middleware, or a combination of an application and middleware, hereinafter). This allows each terminal device 10 to acquire motion data related to the motion of the distributor and transmit, to the server device 20 (distribution server system 20A) via a communication line, a first video including an animation of a virtual character (avatar) changed according to the acquired data. For example, the motion data can be acquired using a motion capture system. As will be readily understood to one of ordinary skill in the art having the benefit of the present disclosure, examples of suitable motion capture systems that can be used with disclosed apparatus and methods include optical motion capture systems, including such systems using passive markers, active markers, or markerless systems and non-optical systems, including inertial and magnetic systems. Motion data can be captured with image capture devices (such as a CCD (charge-coupled device) or CMOS (complementary metal oxide semiconductor) image sensor) coupled to a computer that transforms the motion data into video or other image data. First video data generated using the motion capture system is distributed by the server device 20 (distribution server system 20A) via a communication line to a terminal device (viewer terminal device) 10 for receiving a video. Such a viewer terminal device 10 can execute the video distribution application installed therein (which can be middleware or a combination of an application and middleware, hereinafter) to receive videos.

Also, when operating as a distributor terminal device, each terminal device 10 can execute a browser function incorporated in the installed video distribution application and/or execute an installed web browser application. This allows each terminal device 10 to receive a web page (for example, an HTML document, including in some examples, HTML documents encoding executable code such as JavaScript or PHP code) from the server device 20 (web server device 20B) and execute a computer-implemented game program included in this web page. By executing the game program, each terminal device 10 can generate a second video in which at least one game object is caused to act on the basis of operation data related to the operation of the distributor.

Further, when operating as a distributor terminal device, each terminal device 10 can transmit, by executing the video distribution application, the second video thus generated to the server device 20 (distribution server system 20A) via the communication line. Such the second video is also distributed by the server device 20 (distribution server system 20A) via a communication line to a terminal device (viewer terminal device) 10 for receiving a video which executes an installed video viewing application.

Furthermore, when operating as a distributor terminal device, each terminal device 10 can execute the video distribution application. This allows each terminal device 10 to receive via the communication line from the terminal device 10 of the viewer who views the second video (distributed by the distributor terminal device 10) via the server device 20 (distribution server system 20A), a token to the distributor and/or comment data indicative of transmitting a comment to the distributor. For example, the token can encode data indicative of a virtual token transmitted to the distributor.

On the other hand, when operating as a terminal device (viewer terminal device) for viewing a video, each terminal device 10 can execute an installed video viewing application. This allows each terminal device 10 to receive, via the server device 20 (distribution server system 20A), the first video and/or the second video distributed by the distributor terminal device 10.

Furthermore, when operating as a viewer terminal device, each terminal device 10 can execute the video viewing application. This allows each terminal device 10 to transmit tokens to the distributor and/or comment data indicative of transmitting a comment to the distributor to the distributor terminal device 10A via the server device 20 (distribution server system 20A).

Additionally, the above-described video distribution application and video viewing application can be installed and executed in each terminal device 10 as one integrated application or as separate applications.

Each terminal device 10 can be any terminal device capable of executing such an operation. For example, each terminal device 10 can include at least one of: a smartphone, a tablet, a mobile phone (feature phone), or a personal computer, without being limited thereto.

1-2. Server Device 20

FIG. 1 shows a distribution server system 20A and a web server device 20B as an example of one or more server devices 20.

The distribution server system 20A can distribute the first video and/or the second video transmitted by each terminal device (each distributor terminal device) 10 to each terminal device (each viewer terminal device) 10. Furthermore, the distribution server system 20A can transmit, to the terminal device 10 of a certain distributor, tokens and/or comment data to the distributor that have been transmitted by each terminal device (each viewer terminal device) 10.

In order to execute such operation, the distribution server system 20A, in one embodiment, can include a distribution server device 20a, a DB (database) server device 20b, and a game API (application programming interface) server device 20c that are interconnected via a communication line (including a wireless line and/or a wired line that are not shown).

The distribution server device 20a can distribute, to each terminal device 10, the first video and/or the second video transmitted by the terminal device 10 of each distributor. Furthermore, the distribution server device 20a can store, into a database (DB) server device 20b, token data and/or comment data transmitted by the terminal device 10 of each viewer.

The DB server device 20b can store token data or comment data received from the distribution server device 20a, read token data and/or comment data inquired by the game API server device 20c, and transmit them to the game API server device 20c. The DB server device 20b can be implemented with a processor, memory, and computer-readable media to provide database services (e.g., read and write entries in a relational database) to the distribution server device 20a or the game API server device 20c. In some examples, the distribution server system 20a hosts the devices 20a, 20b, and 20c on the same server using the same physical processor. In other examples, the devices 20a, 20b, and 20c can be hosted on different virtual processors or by different interconnected servers.

When receiving an inquiry about token data and/or comment data from the terminal device 10 of each distributor, the game API server device 20c can read, from the DB server device 20b, token data and/or comment data for the terminal device 10 of the distributor, and transmit them to the terminal device 10 of the distributor.

The example shown in FIG. 1 outlines a configuration in which the distribution server system 20A has three server devices including the distribution server device 20a, the DB server device 20b, and the game API server device 20c for the purpose of balancing the load. However, at least one of the three server devices can be integrated with any of the remaining server devices.

Next, the web server device 20B can transmit, to the terminal device 10 of each distributor having accessed the web server device 20B, a web page (document created according to HTML, for example, HTML5) in which a game program is incorporated. This game program can, when received and decoded by the terminal device 10, cause the terminal device 10 to execute various operations related to distribution of a video including the following exemplified operations below:

Operation of executing the game;
Operation of transmitting, to the distribution server system 20A (distribution server device 20a), a game screen generated in accordance with execution of the game; and/or Operation of acquiring token data and/or comment data transmitted to this distributor from the distribution server system 20A (game API server device 20c).

1-3. Studio Unit 30

The studio unit 30 can be positioned in a studio, room, hall, etc. wherein a performer (distributor) distributes a video. The studio unit 30 can execute the functions which are similar to those of the terminal device 10 and/or the server device 20, as described above.

2. Hardware Configuration of Each Device

Next, an example of the hardware configuration of each of the terminal device 10, the server device 20, and the studio unit 30 will be described.

2-1. Hardware Configuration of Terminal Device 10

Figure 2:
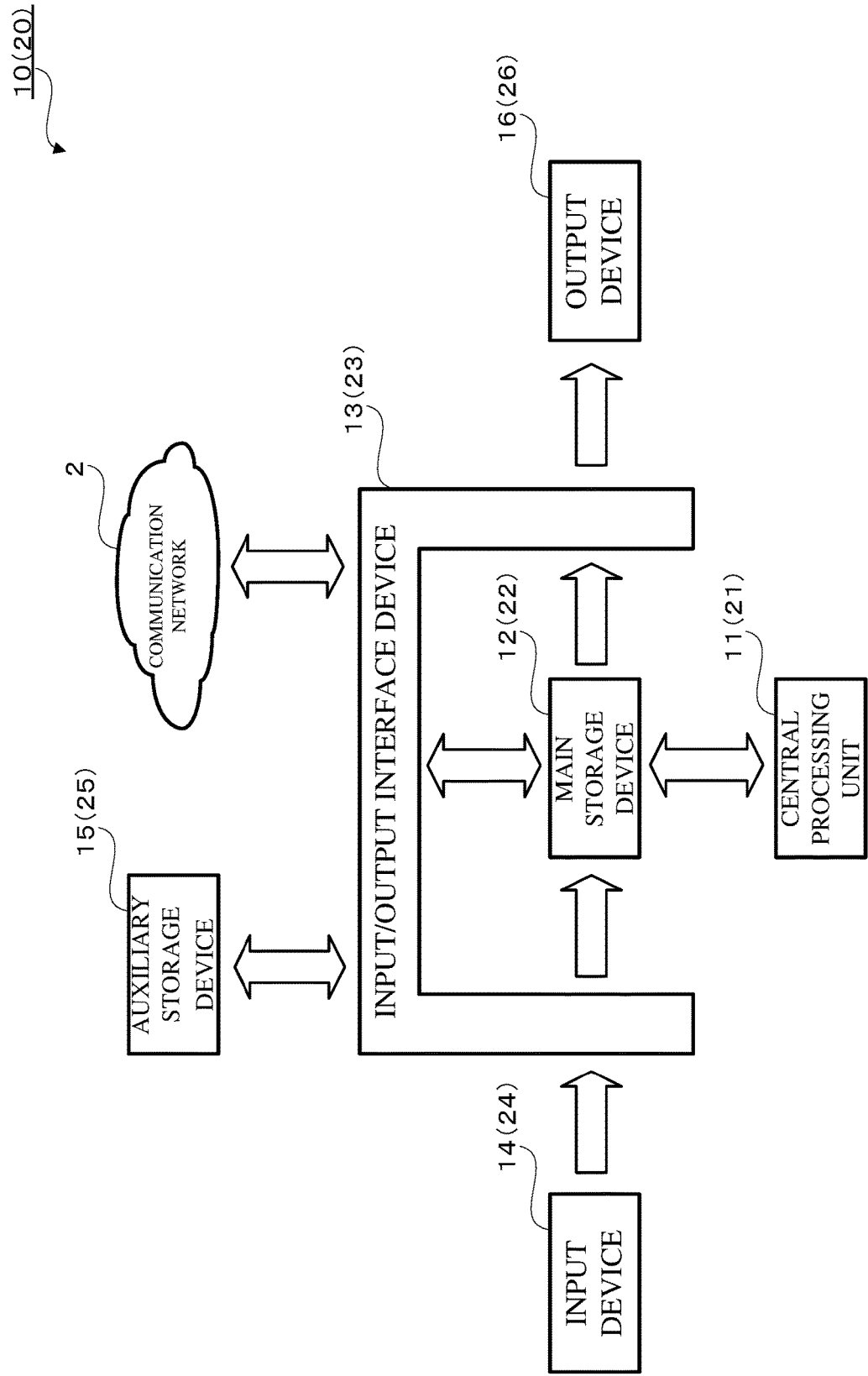
FIG. 2 is a block diagram schematically showing an example of the hardware configuration of the terminal device 10 (server device 20) shown in FIG. 1.

An example of the hardware configuration of each terminal device 10 will be described with reference to FIG. 2. FIG. 2 is a block diagram schematically showing an example of the hardware configuration of the terminal device 10 (server device 20) shown in FIG. 1. (In FIG. 2, reference numerals in parentheses refer to the server device 20 as described later.)

As shown in FIG. 2, each terminal device 10 can mainly include a processor, for example, a central processing unit 11, a main storage device 12, an input/output interface device 13, an input device 14, an auxiliary storage device 15, and an output device 16. These devices are interconnected via a data bus and/or a control bus. The processor may be a real or virtual processor.

The central processing unit 11, which is referred to as a "CPU," can perform operations on instructions and data stored in the main storage device 12, and store the results of the operations in the main storage device 12. Furthermore, the central processing unit 11 can control and receive data from the input device 14, the auxiliary storage device 15, the output device 16, and the like via the input/output interface device 13. The terminal device 10 can include one or more such central processing units 11.

The main storage device 12, which is referred to as a "memory", can store instructions and data received from the input device 14, the auxiliary storage device 15, and a communication line 30 (server device 20 or the like) via the input/output interface device 13, as well as calculation results of the central processing unit 11. The main storage device 12 can include computer-readable media such as volatile memory (e.g., registers, cache, random access memory (RAM)), non-volatile memory (e.g., read-only memory (ROM), EEPROM, flash memory) and storage (e.g., a hard disk drive (HDD), solid-state drive (SSD), magnetic tape, optical media), without being limited thereto. As should be readily understood, the term computer-readable storage media includes the media for data storage such as memory and storage, and not transmission media such as modulated data signals or transitory signals.

The auxiliary storage device 15 is a storage device typically having a capacity larger than that of the main storage device 12. It is possible to store instructions and data (computer programs) constituting the above-described specific applications (video distribution application, video viewing application, and the like), web browser applications, and the like. By being controlled by the central processing unit 11, the auxiliary storage device 15 can transmit these instructions and data (computer programs) to the main storage device 12 via the input/output interface device 13. The auxiliary storage device 15 can include a magnetic disk device and/or an optical disk device, without being limited thereto.

The input device 14 is a device that takes in data from the outside. The input device 14 includes a touch screen, a button, a keyboard, a mouse, and/or a sensor, without being limited thereto. As described later, the sensor can include a sensor including one or more cameras and/or one or more microphones, without being limited thereto. Sensor data can be provided to a motion capture system for use in generating video.

The output device 16 can include a display device, a touch screen, and/or a printer device, without being limited thereto.

In such a hardware configuration, the central processing unit 11 can load, into the main storage device 12, instructions and data (computer programs) constituting a specific application stored in the auxiliary storage device 15, and perform operations with the loaded instructions and data. This allows the central processing unit 11 to control the output device 16 via the input/output interface device 13, or to transmit and receive various data to and from other devices (e.g., the server device 20, another terminal device 10, and/or, the studio unit 30, etc.) via the input/output interface device 13 and the communication line 2.

This allows the terminal device 10 to execute at least one of various operations described below (including various operations described in detail later) by executing computer-executable instructions for the installed specific application:

Operation necessary for distributing the first video and/or the second video;

Operation necessary for receiving token data and/or comment data transmitted from another terminal device 10 to the own terminal device 10;

Operation necessary for receiving the first video and/or the second video distributed by another terminal device 10; or Operation necessary for transmitting token data and/or comment data to another terminal device 10, etc.

Additionally, the terminal device 10 can include one or more microprocessors and/or one or more graphics processing units (GPU) in place of or in addition to the central processing unit 11.

2-2. Hardware Configuration of Server Device 20

An example of the hardware configuration of each server device 20 is described with reference to FIG. 2 similarly. As the hardware configuration of each server device 20 (each of distribution server device 20a, DB server device 20b, game API server device 20c, and web server device 20B), the identical hardware configuration to that of each terminal device 10 described above can be used, for example. Therefore, reference numerals for the components of each server device 20 are shown in parentheses in FIG. 2.

As shown in FIG. 2, each server device 20 can mainly include a central processing unit 21, a main storage device 22, an input/output interface device 23, an input device 24, an auxiliary storage device 25, and an output device 26. These devices are interconnected via a data bus and/or a control bus.

The central processing unit 21, the main storage device 22, the input/output interface device 23, the input device 24, the auxiliary storage device 25, and the output device 26 may be substantially identical to the central processing unit 11, the main storage device 12, the input/output interface device 13, the input device 14, the auxiliary storage device 15, and the output device 16, respectively, included in each terminal device 10 described above.

In such a hardware configuration, the central processing unit 21 can sequentially load, into the main storage device 22, instructions and data (computer programs) constituting a specific application stored in the auxiliary storage device 25, and calculate the loaded instructions and data. This allows the central processing unit 21 to control the output device 26 via the input/output interface device 23, or to transmit and receive various data to and from other devices (e.g., each terminal device 10 and/or the studio unit 30, etc.) via the input/output interface device 23 and the communication line 2.

This allows the server device 20 to execute an operation necessary for distributing, to the terminal device 10 of each viewer, the first video and/or the second video transmitted by the terminal device 10 of each distributor, an operation necessary for transmitting, to the terminal device 10 of a certain distributor, token data and/or comment data transmitted by the terminal device 10 of each viewer to the terminal device 10 of the distributor, and the like (including various operations described in detail later).

Additionally, the server device 20 can include one or more microprocessors and/or one or more graphics processing units (GPU) in place of or in addition to the central processing unit 21.

2-3. Hardware Configuration of Studio Unit 30

Each studio unit 30 can execute the functions which are similar to those of the terminal device 10 and/or the server device 20, as described above. Thus, the studio unit 30 can have the hardware configuration which is similar to that of the terminal device 10 and/or the server device 20.

3. Functions of Each Device

Next, an example of functions of each of the terminal device 10, the server device 20, and the studio unit 30 will be described.

3-1. Functions of Terminal Device 10

Figure 3:
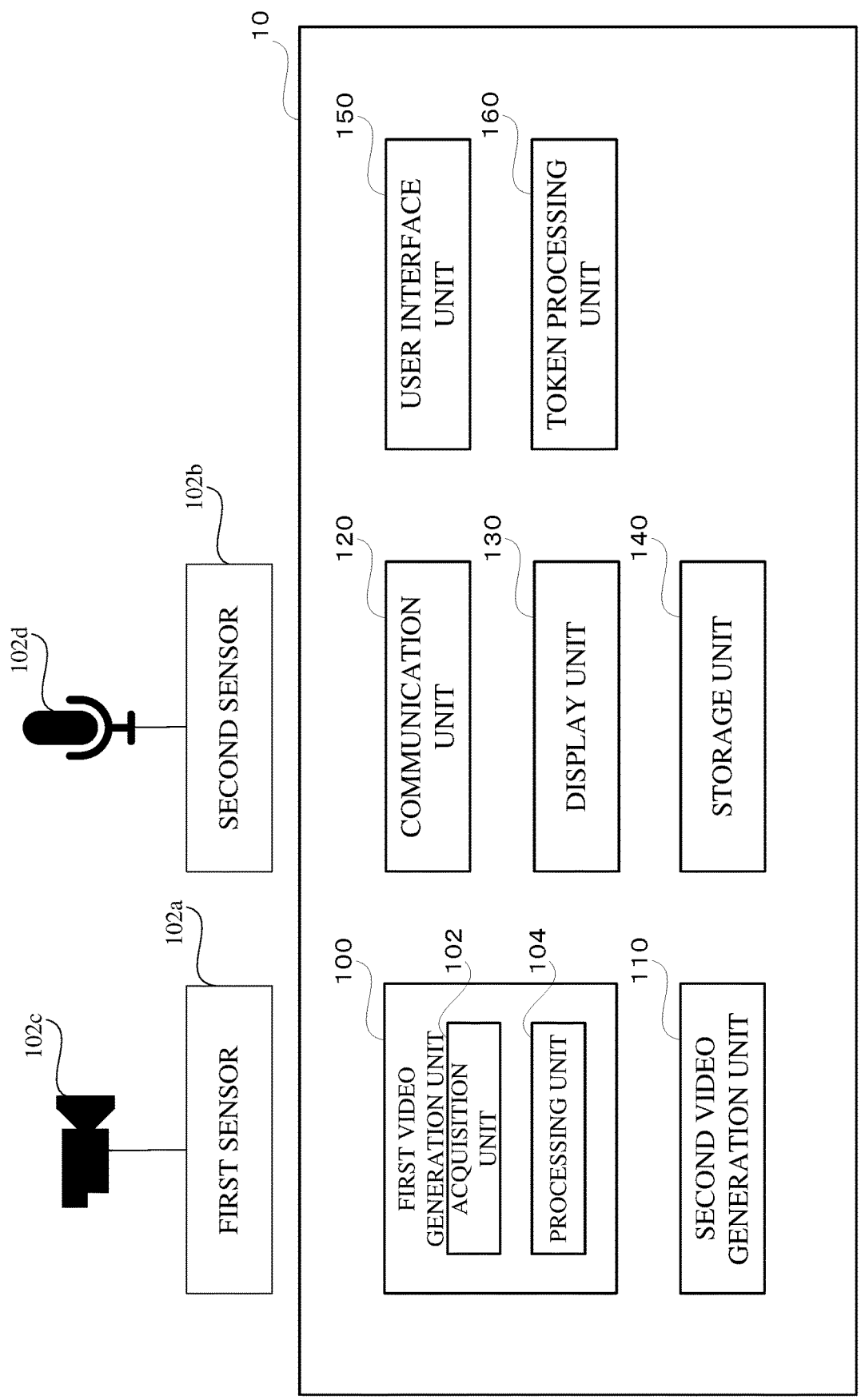
FIG. 3 is a block diagram schematically showing an example of a function of the terminal device 10 shown in FIG. 1.

An example of the function of the terminal device 10 will be described with reference to FIG. 3. FIG. 3 is a block diagram schematically showing an example of a function of the terminal device 10 shown in FIG. 1.

As shown in FIG. 3, the terminal device 10 can mainly include a first video generation unit 100, a second video generation unit 110, a communication unit 120, a display unit 130, a storage unit 140, a user interface unit 150, and a token processing unit 160.

(1) First Video Generation Unit 100

The first video generation unit 100 can generate the first video including an animation of an avatar of a distributor on the basis of motion data related to the motion of the distributor. In order to realize this, the first video generation unit 100 can include an acquisition unit 102 and a processing unit 104, for example.

The acquisition unit 102 can include one or more first sensors 102a that acquire data related to the body of the distributor, and one or more second sensors 102b that acquire voice data related to speech and/or vocal given by the distributor.

In a preferred embodiment, the first sensor 102a can include an RGB camera 102c that captures visible light and a near infrared camera that captures near infrared rays. As such a camera, it is possible to use a camera included in a True Depth camera of iPhone X, for example. The second sensor 102b can include a microphone 102d to record voice and other audio.

First, regarding the first sensor 102a, the acquisition unit 102 captures an image of the body of the distributor using the first sensor 102a arranged close to the body of the distributor. This allows the acquisition unit 102 to generate data in which an image acquired by the RGB camera is recorded over a unit time in association with a time code (code indicative of the time of acquisition). The data described above can be an MPEG file, for example.

Furthermore, the acquisition unit 102 can generate data in which a predetermined number (e.g., 51) of numerical values (e.g., floating-point numerical values) indicative of the depth acquired by the near infrared camera are recorded over a unit time in association with the time code. The data described above can be, for example, a TSV file, which is a file in which a plurality of data are recorded by separating the data with tabs.

Regarding the near infrared camera, more specifically, a dot projector emits an infrared laser including a dot (point) pattern to the body of the performer, and the near infrared camera captures infrared dots projected and reflected on the body of the performer, thereby generating an image of the infrared dots captured in this manner. The acquisition unit 102 can compare an image of the dot pattern emitted by the dot projector registered in advance with an image captured by the near infrared camera. This allows the acquisition unit 102 to calculate the depth of each point (each feature point) by using positional deviation at each point (each feature point) in both images. Here, the points can include 51 points, for example. The depth of each point indicates the distance between each point and the near infrared camera. The acquisition unit 102 can generate data in which a numerical value indicative of the thus calculated depth is recorded over a unit time in association with the time code as described above.

Next, regarding the second sensor 102b, the acquisition unit 102 acquires the voice related to the speech and/or vocal given by the distributor using the second sensor 102b arranged close to the body of the distributor. This allows the acquisition unit 102 to generate data recorded over a unit time in association with the time code. The data described above can be an MPEG file, for example. In an embodiment, the acquisition unit 102 can acquire data related to the body of the distributor using the first sensor 102a, and at the same time, acquire voice data related to speech and/or vocal given by the distributor using the second sensor 102b. In this case, the acquisition unit 102 can generate data (e.g., MPEG file) in which an image acquired by the RGB camera and voice data related to speech and/or vocal given by the distributor using the second sensor 102b are recorded over a unit time in association with an identical time code.

The acquisition unit 102 can output, to the processing unit 104, the thus generated data (MPEG file, TSV file, and the like) related to the body of the distributor and/or the voice data (MPEG file and the like) related to the speech and/or vocal given by the distributor.

Here, the case where the first sensor 102a includes an RGB camera and an infrared camera has been described. However, the first sensor 102a can include any of the following (A) to (C), for example.

(A) A camera that detects infrared rays emitted by an infrared laser and reflected on the face of the performer;
(B) A plurality of RGB cameras that capture visible light; or
(C) A single camera that captures visible light.

In the case of (A), the acquisition unit 102 can calculate the depth of each feature point on the body of the distributor by the same technique as that described above. In the case of (B), the acquisition unit 102 can calculate the depth of each feature point on the body of the distributor using a plurality of images captured by the plurality of RGB cameras. In the case of (C), the acquisition unit 102 can calculate, by using deep learning or the like, the depth of each feature point on the body of the distributor from the image captured by the single camera. Furthermore, in the case of (C), the acquisition unit 102 can calculate the depth of each feature point on the body of the performer by analysis processing (image processing and the like) for the image captured by the single camera.

On the basis of the data related to the body of the distributor from the acquisition unit 102, the processing unit 104 can generate a video including an animation of a virtual character (an avatar of the distributor). Regarding the video itself of a virtual character, the processing unit 104 can generate the video of the virtual character by causing a rendering unit (not shown) to execute rendering using various data stored in a character data storage unit (not shown). The various data described above can include, for example, geometry data, bone data, texture data, shader data, and blend shape data.

Furthermore, the processing unit 104 can generate, by using various well-known technologies, a video in which the facial expression, etc. of the avatar is changed by using the data related to the body of the distributor from the acquisition unit 102 (data related to the depth of each feature point on the body of the performer). The video described above can be, for example, a video in which the facial expression of the avatar is changed in synchronization with the movement of the mouth and both eyes of the performer, e.g., a video in which the facial expression of the avatar is changed by lip sync and gaze tracking of the face of the performer.

Additionally, any other suitable technology can be used in order to generate the first video including an animation of the avatar of the distributor on the basis of motion data related to the action of the distributor. An example of such technology includes a technique referred to as "blend shapes" described in a website identified by the following URL.

https://developer.apple.com/documentation/arkit/arfaceanchor/2928251-blendshapes When this technology is used, the processing unit 104 can adjust parameters of one or more feature points corresponding to the action of the distributor among a plurality of feature points on the upper body (face and so on) of the distributor. This allows the processing unit 104 to generate a video of a virtual character that follows the action of the distributor.

(2) Second Video Generation Unit 110

The second video generation unit 110 can generate the second video related to the computer-implemented game on the basis of operation data related to the operation of the distributor by using the web page received from the web server device 20B.

Specifically, the second video generation unit 110 can execute a game program incorporated in the web page received from the web server device 20B. This allows the second video generation unit 110 to draw the second video (game video) related to the game in which at least one game objects act, on the basis of the operation data indicative of the operation of the distributor having been input by the user interface unit 150. For example, the operation data can include one or more of the following: data indicative of how the distributor has swiped a touch pad display, data indicative of which object the distributer has tapped or clicked, or data indicative of how the distributor has dragged a touch pad display, or other such operation data.

Further, the second video generation unit 110 can control at least one game objects to be displayed in the second video on the basis of the token data generated by the terminal device of each viewer viewing the second video and sent to the user (distributor) of the terminal device 10. Additionally, the token data indicate that a token is given to the distributor.

(3) Communication Unit 120

The communication unit 120 can communicate various data required for distribution and/or viewing of a video between the distribution server system 20A and the web server device 20B. For example, when the terminal device 10 operates as the terminal device of the distributor, the communication unit 120 can access the web server device 20B and receive a web page (HTML document) including a game program used for execution of the game, etc. When the terminal device 10 operates as the terminal device of the distributor, the communication unit 120 can transmit the first video and/or the second video to the distribution server system 20A, and receive, from the distribution server system 20A, token data and/or comment data transmitted to the distributor.

Furthermore, when the terminal device 10 operates as the terminal device of the viewer, the communication unit 120 can receive, from the distribution server system 20A, the first video and/or the second video transmitted by the terminal device 10 of the distributor, and transmit token data and/or comment data for the distributor to the distribution server system 20A.

(4) Display Unit 130

The display unit 130 can display various images for distribution and/or viewing of the video. For example, the display unit 130 can display the first video and/or the second video to be distributed and/or the first video and/or the second video having been received.

(5) Storage Unit 140

The storage unit 140 can store various data used for distribution and/or viewing of the video.

(6) User Interface Unit 150

The user interface unit 150 can input various data required for distribution and/or viewing of the video through a user manipulation. For example, when the computer-implemented game is executed, the user interface unit 150 can input operation data indicative of the contents of the manipulation of the distributor from the distributor and output the operation data to the second video generation unit 110.

(7) Token Processing Unit 160

The token processing unit 160 can process token data transmitted and received in relation to distribution and/or viewing of the video. For example, when the terminal device 10 operates as the terminal device 10 of the distributor, the token processing unit 160 can process the token data transmitted to the distributor. When the terminal device 10 operates as the terminal device 10 of the viewer, the token processing unit 160 can process the token data to be transmitted by the viewer.

3-2. Functions of Server Device 20

Figure 4:
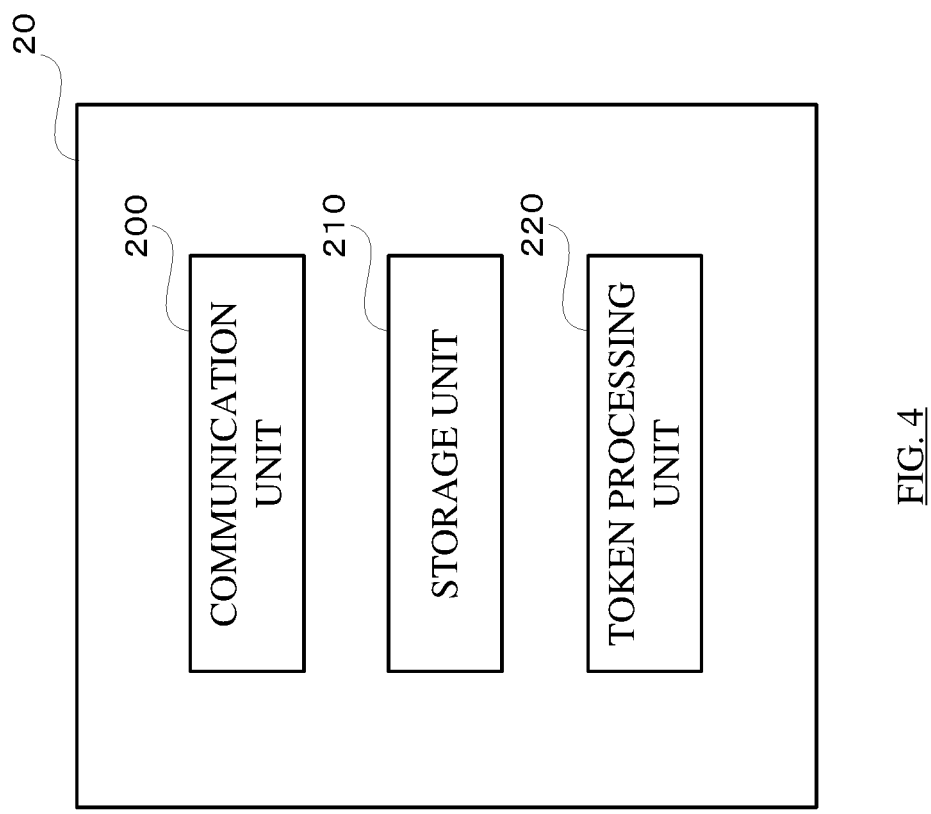
FIG. 4 is a block diagram schematically showing an example of a function of the server device 20 shown in FIG. 1.

An example of the function of the server device 20 will be described with reference to FIG. 4. FIG. 4 is a block diagram schematically showing an example of a function of the server device 20 shown in FIG. 1.

As shown in FIG. 4, the server device 20 can mainly include a communication unit 200, a storage unit 210, and a token processing unit 220.

The communication unit 200 can communicate various data used for distribution and/or viewing of a video between the terminal device 10 of the distributor and/or the terminal device 10 of the viewer. For example, when operating as the distribution server system 20A, the server device 20 can receive the first video and/or the second video from the terminal device 10 of each distributor and distribute the first video and/or the second video to the terminal device 10 of each viewer. When operating as the web server device 20B, the server device 20 can transmit, to the terminal device 10 of each distributor having accessed, a web page in which a computer-implemented game program is incorporated.

The storage unit 210 can store various data used for distribution and/or viewing of the video.

The token processing unit 220 can process the token data transmitted from each viewer to each distributor.

Additionally, when the server device 20 operates as the web server device 20B, the token processing unit 220 may be omitted.

3-3. Functions of Studio Unit 30

The studio unit 30 can execute the functions which are similar to those of the terminal device 10 and/or the server device 20, as described above. Thus, the studio unit 30 can have the functions which are the same as those of the terminal device 10 as described above with reference to FIG. 3, and/or, those of the server device 20 as described above with reference to FIG. 4.

4. Overall Operation of Video Distribution System 1

Figure 5A:
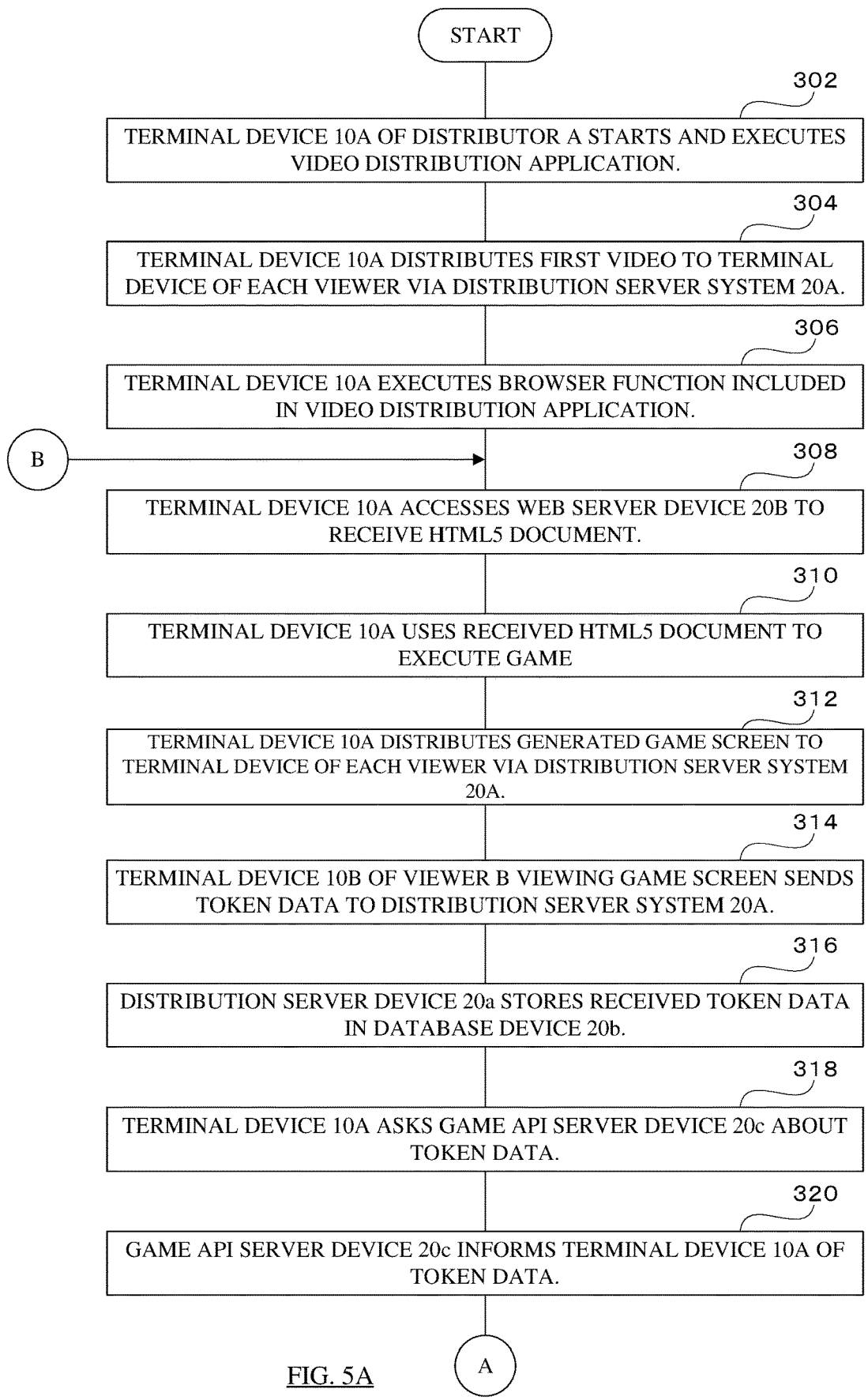
FIG. 5A is a flowchart showing an example of the operation performed in the video distribution system 1 shown in FIG. 1.
Figure 5B:
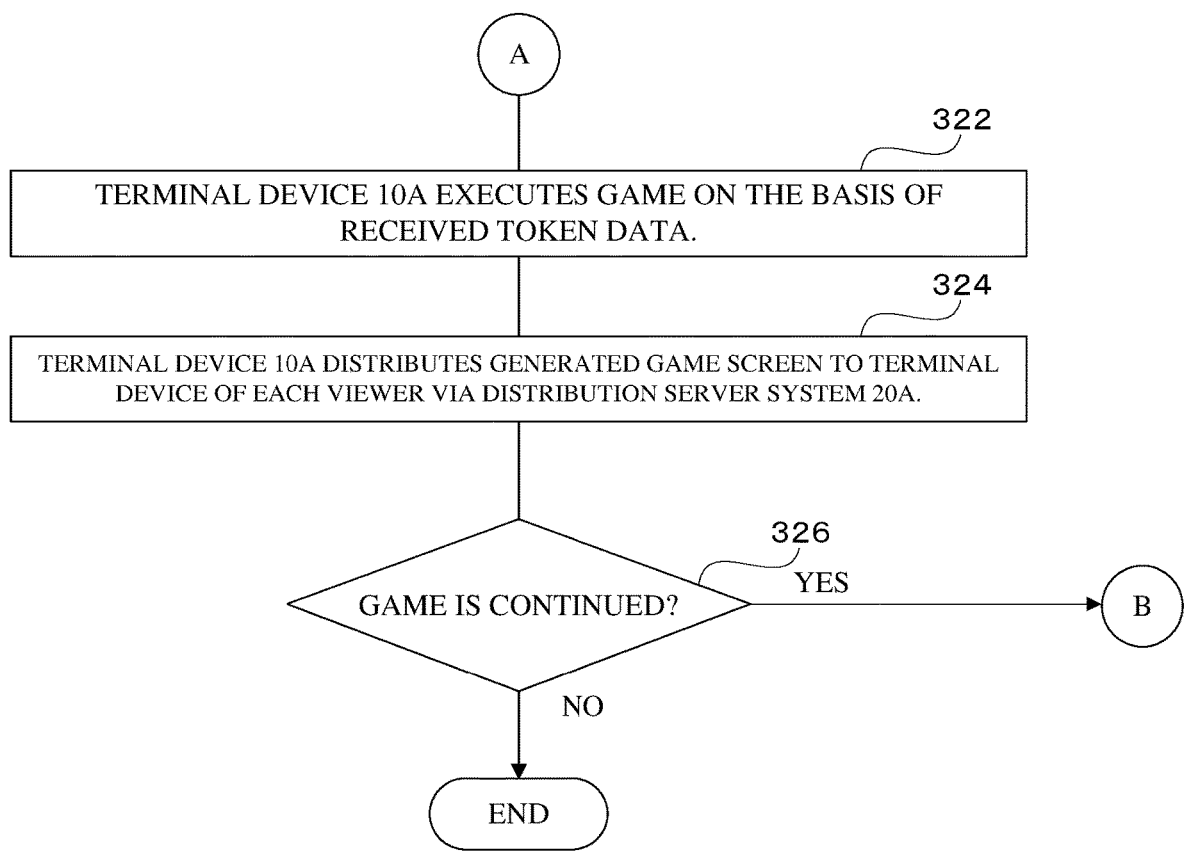
FIG. 5B is a flowchart showing an example of the operation performed in the video distribution system 1 shown in FIG. 1.

Next, the overall operations performed in the video distribution system 1 having the above configuration will be described with reference to FIGS. 5A and 5B. FIGS. 5A and 5B are flowcharts showing an example of operations performed in the video distribution system 1 shown in FIG. 1.

First, referring to FIG. 5A, in step (hereinafter referred to as "ST") 302, the terminal device 10 (here, the terminal device 10A) starts and executes a video distribution application in accordance with the operation of the distributor (here, a distributor A).

Figure 6:
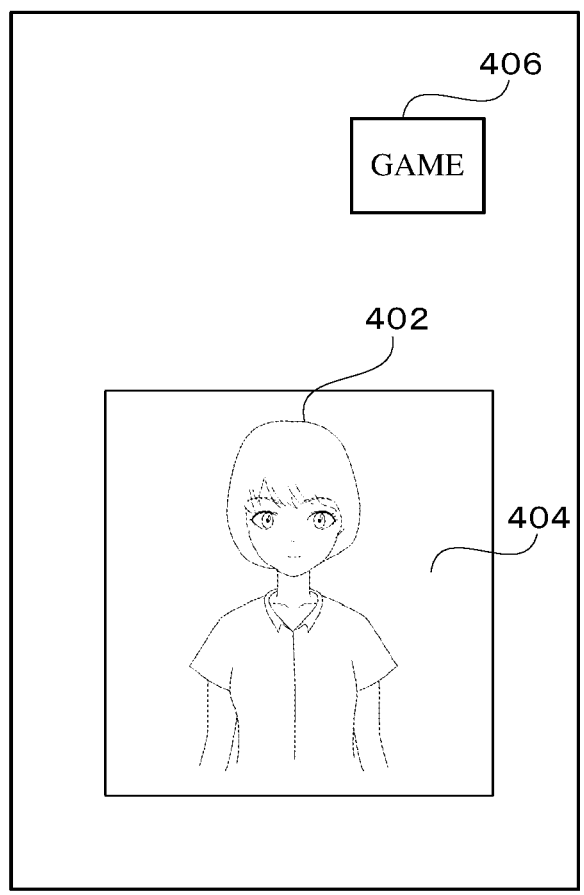
FIG. 6 is a diagram showing an example of the first video displayed in the terminal device 10 used in the video distribution system 1 shown in FIG. 1.

Next, in ST304, the terminal device 10A generates the first video including animation of the avatar object of the distributor A on the basis of the motion data related to the motion of the distributor A. Thus, as illustrated in FIG. 6, the display unit 130 of the terminal device 10A displays a first video 404 including animation of an avatar object 402 of the distributor A.

Returning to FIG. 5A, the terminal device 10A further transmits the generated first video 404 to the distribution server device 20a of the distribution server system 20A. The distribution server device 20a distributes the first video received from the terminal device 10A to the terminal device 10 of each viewer executing the video viewing application. Thus, the display unit 130 of the terminal device 10 of each viewer also displays the first video 404 as illustrated in FIG. 6.

Next, in ST306, when the distributor A taps an icon 406 "Game" (see FIG. 6) displayed on the display unit 130 of the terminal device 10A, the terminal device 10A executes the browser function installed in the video distribution application. Thus, in ST308, by accessing the web server device 20B in a state where the video distribution application is executed (i.e., the first video 404 is distributed to the terminal device 10 of each viewer), the terminal device 10A can receive an HTML5 document in which a game program is incorporated.

Figure 7:
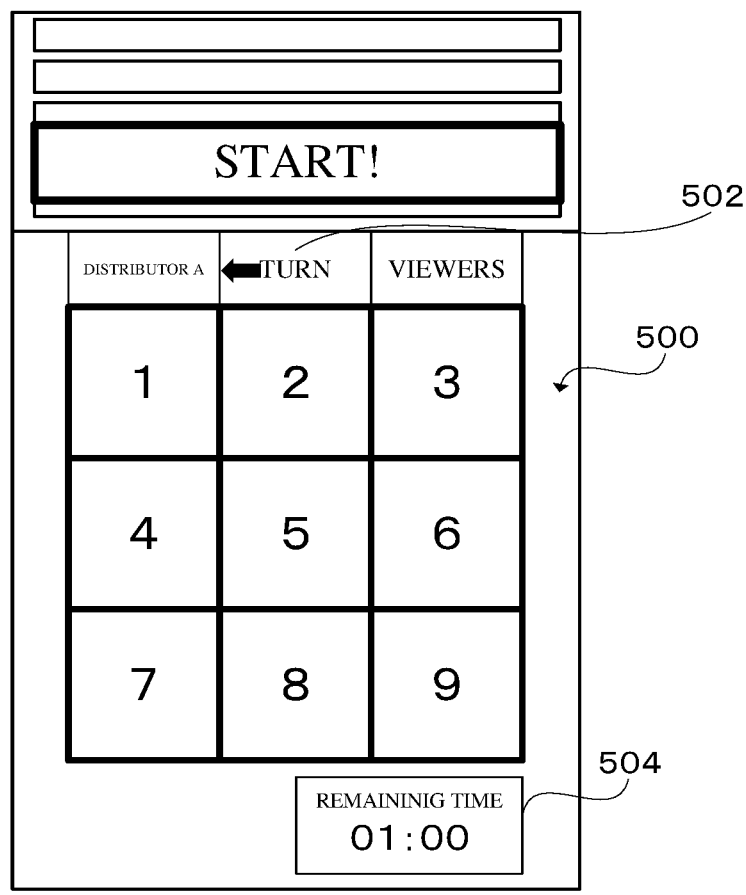
FIG. 7 is a diagram showing an example of the second video displayed in the terminal device 10 used in the video distribution system 1 shown in FIG. 1.

Next, in ST310, the terminal device 10A can generate a video (second video) related to the game by executing the game program incorporated in the received HTML5 document. FIG. 7 shows an example of a second video 500 generated by the terminal device 10A in this manner.

Next, back to FIG. 5A, in ST312, the terminal device 10A transmits the second video (game screen) 500 (in addition to or without transmitting the first video 404) generated in ST310 to the distribution server device 20a of the distribution server system 20A. The distribution server device 20a distributes the second video (along with or without the first video 404) received from the terminal device 10A to the terminal device 10 of each viewer executing the video viewing application. Thus, the display unit 130 of the terminal device 10 of each viewer can also display the second video 500 (in a state of being superposed over the first video 404 as illustrated in FIG. 6, for example, with most of the first video 404 hidden).

Next, back to FIG. 5A, it is considered, in ST314, a case where a viewer (here viewer B) viewing the second video 500 transmitted by the terminal device 10A gives a certain token (G1 as an example here) to the distributor A. By operating the terminal device 10B, the viewer B can select the token G1 from a plurality of prepared tokens and select a command to be given to the distributor A. Additionally, such command selection can be executed via a user interface not shown displayed on the terminal device 10B. Thus, the terminal device 10B transmits token data indicating that the token G1 is given to the distributor A to the distribution server device 20a of the distribution server system 20A. This token data can include, for example, receiver identification data for identifying the receiver of the token (distributor A), token identification data for identifying the token (token G1), and sender identification data for identifying the sender of the token (viewer B).

When operating the terminal device 10B to give a token, the viewer B can also send a comment along with the token. In this case, the token data that the terminal device 10B sends to the distribution server device 20a can include comment data in addition to the receiver identification data, the token identification data, and the sender identification data.

In ST316, the distribution server device 20a can store the token data received from the terminal device 10B in the DB server device 20b. For example, the DB server device 20b can store, as token data, item count identification data for identifying how many tokens have been given before the token is given, the token identification data, and the sender identification data (moreover, comment data), corresponding to the receiver identification data.

In ST318, the terminal device 10A of the distributor A can make an inquiry to the game API server device 20c as to whether new token data have arrived the distributor A at predetermined intervals during the execution of the game. For example, in a case where the terminal device 10A has received so far one piece of token data from the game API server device 20c since the game was started, the terminal device A can make an inquiry to the game API server device 20c about the presence or absence of the second and subsequent pieces of token data.

In ST320, in response to an inquiry from the terminal device 10A, the game API server device 20c gives the DB server device 20b a request for the second and subsequent pieces of token data about the distributor A. In a case where the DB server device 20b has successfully retrieved the second and subsequent pieces of item count identification data as the item count identification data stored in association with the distributor A (receiver identification data), the DB server device 20b transmits, to the game API server device 20c, as the second piece of token data, the token identification data and the sender identification data (moreover, comment data) corresponding to each of the second and subsequent pieces of item count identification data. Here, on an assumption that the DB server device 20b has successfully retrieved only the second piece of item count identification data, the DB server device 20b transmits, to the game API server device 20c, as second token data, the token identification data and the sender identification data (moreover, comment data) corresponding to the second piece of item count identification data. In response to this, the game API server device 20c transmits the second piece of token data to the terminal device 10A of the distributor A.

Next, referring to FIG. 5B, in ST322, the terminal device 10A having received the second piece of token data can execute the game on the basis of this second piece of token data. The terminal device 10A can execute the game on the basis of the token (token G1, here) uniquely identified by the token identification data included in the token data, the sender (viewer B, here) identified by the sender identification data included in the token data, and the like. Thus, the terminal device 10A generates the second video 500 including at least one game object controlled on the basis of the token data. Additionally, how the game is executed by the terminal device 10 of the distributor on the basis of the token data and what kind of second video is generated by the execution of such a game will be described later.

Additionally, since the terminal device 10A has received two pieces of token data from the game API server device 20c so far (the terminal device 10A has identified how many pieces of token data it has received so far during the execution of the game), in the next cycle, the terminal device 10A can make an inquiry to the game API server device 20c about the presence or absence of the third or subsequent pieces of token data.

Next, in ST324, the terminal device 10A distributes the second video 500 including at least one game object controlled on the basis of the token data in this manner to the terminal device 10 of each viewer via the distribution server system 20A by the similar method to that in ST312.

Next, in ST326, if the terminal device 10A continues the game, it is possible to repeat the above-described processing in ST308 and thereafter. On the other hand, if the terminal device 10A does not continue the game, the processing ends.

5. Specific Example of Game Executed by Terminal Device 10 of Distributor

Next, a specific example will be described regarding how the terminal device 10 that executes the game program embedded in the HTML5 document received from the web server device 20B controls the game object and executes the game, on the basis of the token data received from the game API server device 20c.

Here, a case of playing a game called tic-tac-toe will be described as an example. In tic-tac-toe, first, a total of (N×N) grids (9 grids, here) composed of N rows×N columns (N=3, here, as illustrated in FIG. 7) are prepared. The distributor and one or more viewers viewing the second video are divided into friends and foes, and, by using the first turn and the second turn, each selects and acquires one grid as its own area. The first turn and the second turn are repeated alternately. As a result, of interaction between the distributor and the viewer (or viewer team), the user who first acquires N (three, here) linearly continuous regions adjacent to each other in a vertical, horizontal, or diagonal direction is defined as the winner. Additionally, each grid is one option used in tic-tac-toe for both the distributor and the viewer team.

Additionally, here, the first turn in which the distributor (distributor A) acquires one grid and the second turn in which the viewer team acquires one grid are alternately repeated, but on the contrary, the viewer team and the distributor can use the first turn and the second turn, respectively.

FIG. 7 illustrates the second video 500 immediately after the start of the game. In a game object 502 "Turn", an arrow directed to the "distributor A" indicates that the first turn is being executed. A game object 504 "Remaining time" indicates the time remaining for the execution of the first turn. Here, the first turn and the second turn are each given one minute of time.

Figure 8:
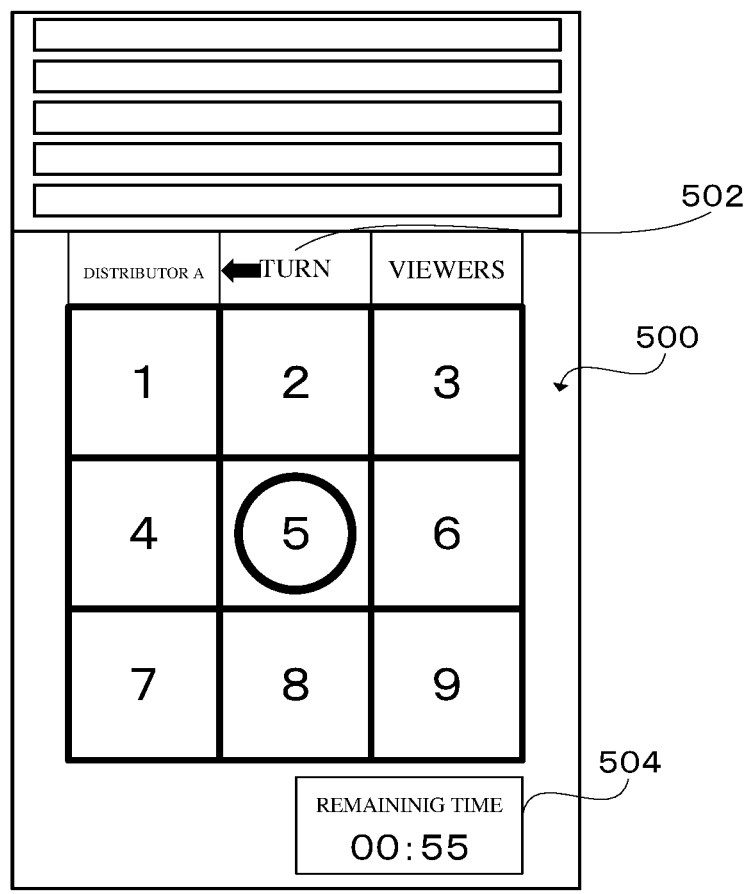
FIG. 8 is a diagram showing another example of the second video displayed in the terminal device 10 used in the video distribution system 1 shown in FIG. 1.

Using the user interface unit 150 of the terminal device 10A, the distributor A can select and acquire a grid 5 as shown in FIG. 8. Thus, in the video 500, a game object "○" (circle) is displayed inside the grid 5. This symbol "○" indicates that the grid 5 is a region of the distributor A. Although the remaining time is 55 seconds, the first turn ends when the distributor A selects the grid 5.

Figure 9:
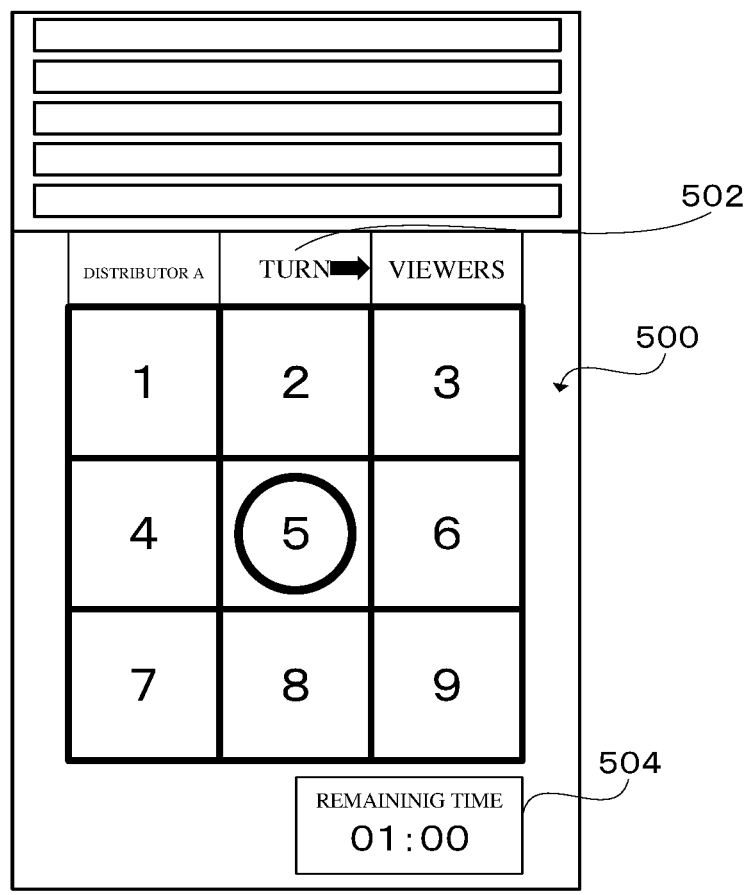
FIG. 9 is a diagram showing another example of the second video displayed in the terminal device 10 used in the video distribution system 1 shown in FIG. 1.

Due to this, as shown in FIG. 9, in the "Turn" object 502, the arrow directed to the "Viewer" indicates that the viewer team is executing the second turn for selecting a grid. The "Remaining time" object 504 returns to one minute.

Referring to FIGS. 9 and 10, a grid 1 to a grid 9 (e.g., option of grid 1 to option of grid 9) are assigned, for example, a token G5, a token G9, a token G2, a token G4, a token G6, a token G3, a token G7, a token G1, and a token G8, respectively. Although not shown in FIG. 9, it is assumed that each viewer can recognize such assignment. For example, such assignment is displayed on the menu screen and other screens before starting the game, whereby each viewer can recognize such the assignment. Alternatively, although not shown in FIG. 9, in the video 500, a token object corresponding to a token assigned to each grid is displayed in association with each grid, whereby each viewer can recognize such the assignment.

Using the user interface unit 150 of the terminal device 10, each viewer who views the video 500 can select (vote) a token assigned to a grid desired to acquire as a region of the viewer team among a plurality types of tokens (e.g., token G1 to token G9). Thus, the terminal device 10 of each viewer can transmit, to the terminal device 10A of the distributor A, via the distribution server system 20A, the token data indicative of giving the selected token to the distributor. Additionally, in this second turn, it is possible for the terminal device 10 of an identical viewer to transmit one or a plurality of pieces of token data indicating that the identical type of token is given to the distributor A. It is also possible for the terminal device 10 of an identical viewer to transmit one or a plurality of pieces of token data indicating that another type of token is given to the distributor A.

Figure 11:
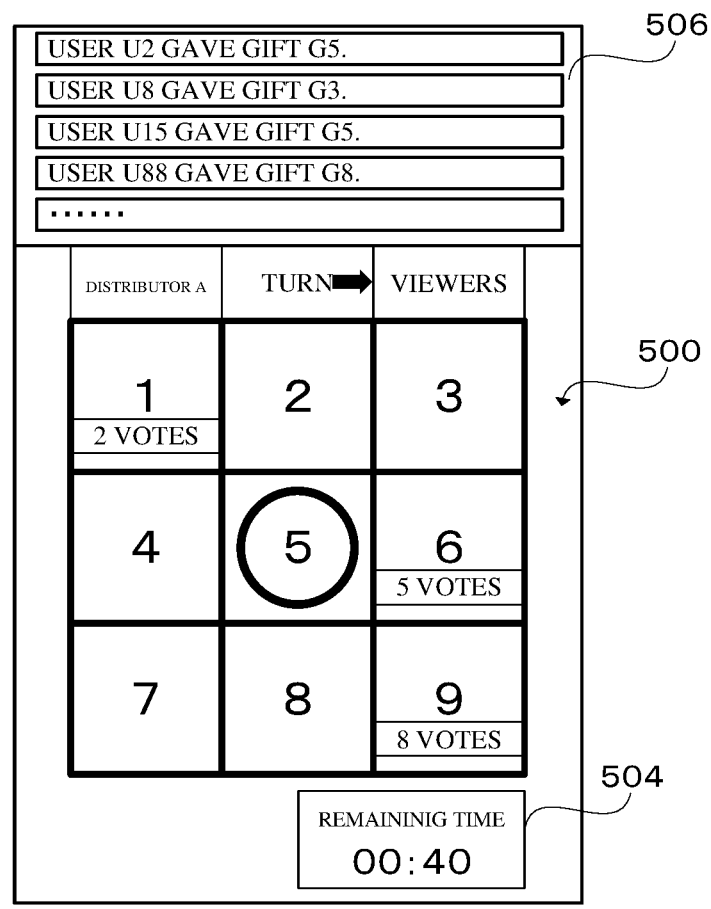
FIG. 11 is a diagram showing another example of the second video displayed in the terminal device 10 used in the video distribution system 1 shown in FIG. 1.

The terminal device 10A of the distributor A can recognize how many of each of the tokens G1 to G9 have been given on the basis of the token identification data included in the token data received from the terminal device 10 of each viewer. Thus, the terminal device 10A of the distributor A can calculate the total number of the tokens assigned to each of the grids 1 to 9 (option of grid 1 to option of grid 9) on the basis of the token data received from the terminal device 10 of each viewer. Therefore, the terminal device 10A of the distributor A can display that two votes have been cast for the grid 1, for example, on the basis of the fact that two tokens G5 corresponding to the grid 1 have been given, as shown in FIG. 11. Similarly, the terminal device 10A of the distributor A can display that five votes (or eight votes) have been cast for the grid 6 on the basis of the fact that five (or eight) tokens G3 (or tokens G8) corresponding to the grid 6 (or grid 9) are given.

Additionally, in response to reception of the token data from the terminal device 10 of the viewer, the terminal device 10A of the distributor A can display, in a field 506, that the viewer identified by the sender identification data has sent a token corresponding to the token identification data to the distributor A on the basis of the token identification data and the sender identification data included in the token data. This allows each viewer to confirm the fact that the token sent by himself/herself has been surely given to the distributor A. Additionally, also in FIGS. 13 to 24, which will be referred to later, similar items can be displayed in the field 506, but they are omitted for simplicity.

Figure 12:
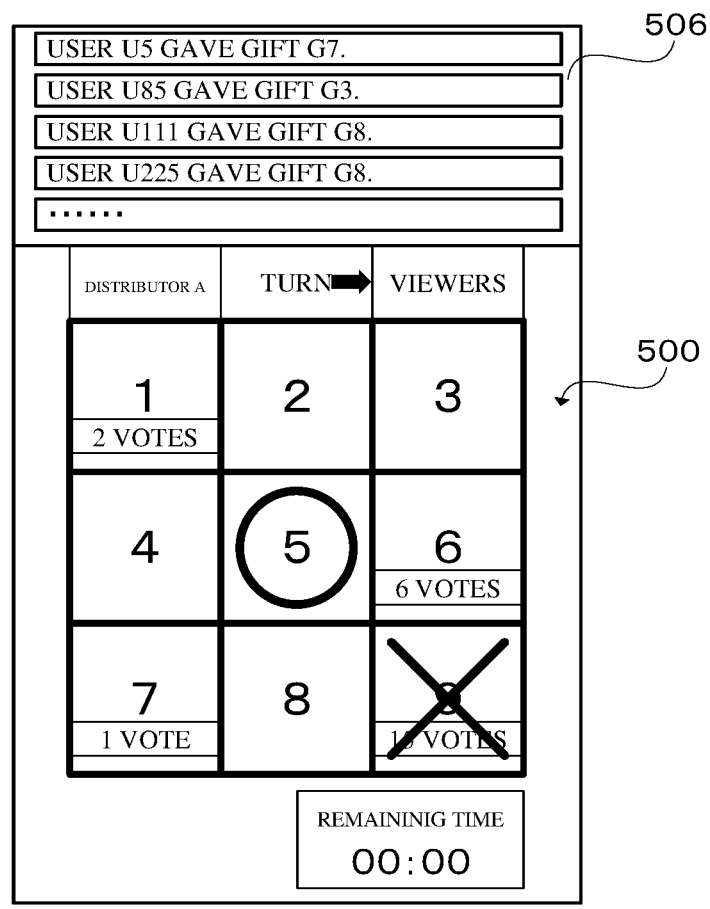
FIG. 12 is a diagram showing another example of the second video displayed in the terminal device 10 used in the video distribution system 1 shown in FIG. 1.

Next, as shown in FIG. 12, at the time when the remaining time is over, the terminal device 10A of the distributor A can recognize that two votes, six votes, one vote, and 15 votes have been cast for the grids 1, 6, 7, and 9, respectively. Hence, the terminal device 10A can determine, as the final option of the viewer team, of the option of the grid 1 to the option of the grid 9, the option that has the maximum score based on the total number of assigned tokens having been given. In one embodiment, the score based on the total number of given tokens assigned to each option can be the identical to the total number (coefficient multiplied by the total number=1). Here, since the terminal device 10A has the maximum total number (15 votes) of the given tokens G8 assigned to the option of the grid 9, the option of the grid 9 having the maximum score can be determined as the final option of the viewer team. Thus, the terminal device 10A can display (control) a game object called "X" (cross) to this grid 9 on the basis of the option of the grid 9 as shown in FIG. 12.

Figure 13:
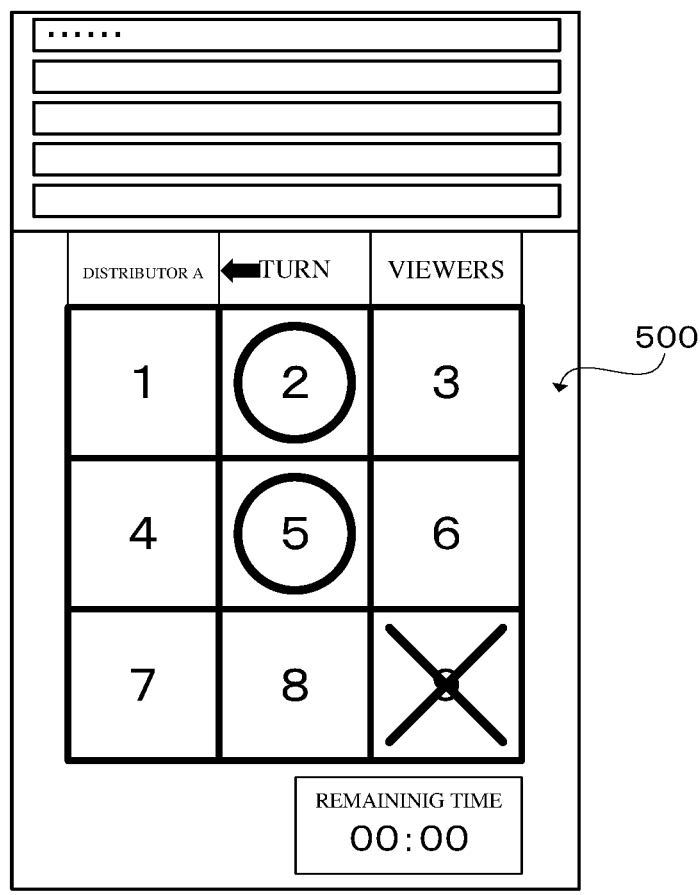
FIG. 13 is a diagram showing another example of the second video displayed in the terminal device 10 used in the video distribution system 1 shown in FIG. 1.

Next, as shown in FIG. 13, it is assumed that the distributor A selects the grid 2 in the first turn of the second time.

Figure 14:
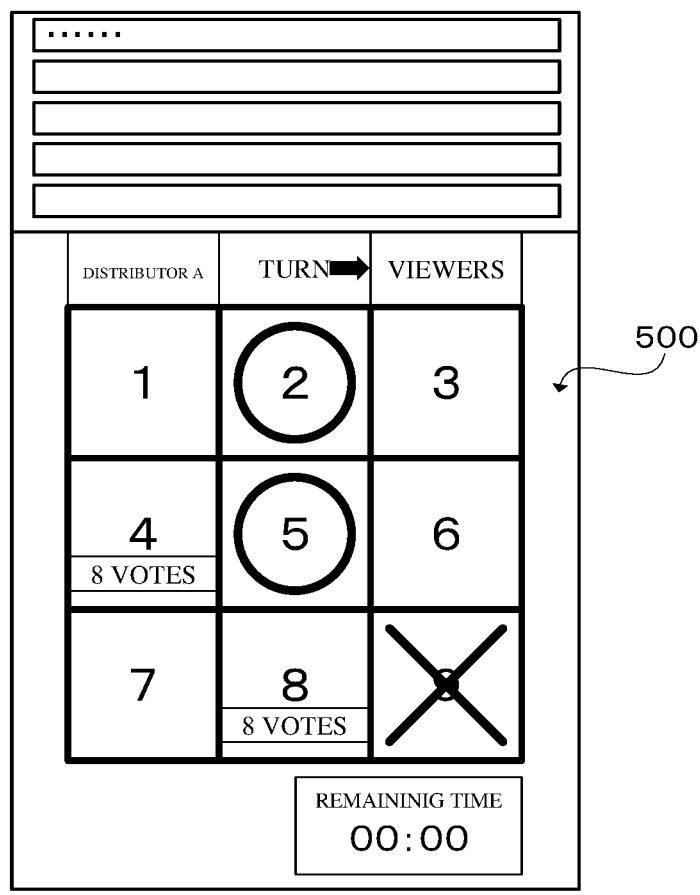
FIG. 14 is a diagram showing another example of the second video displayed in the terminal device 10 used in the video distribution system 1 shown in FIG. 1.
Figure 15:
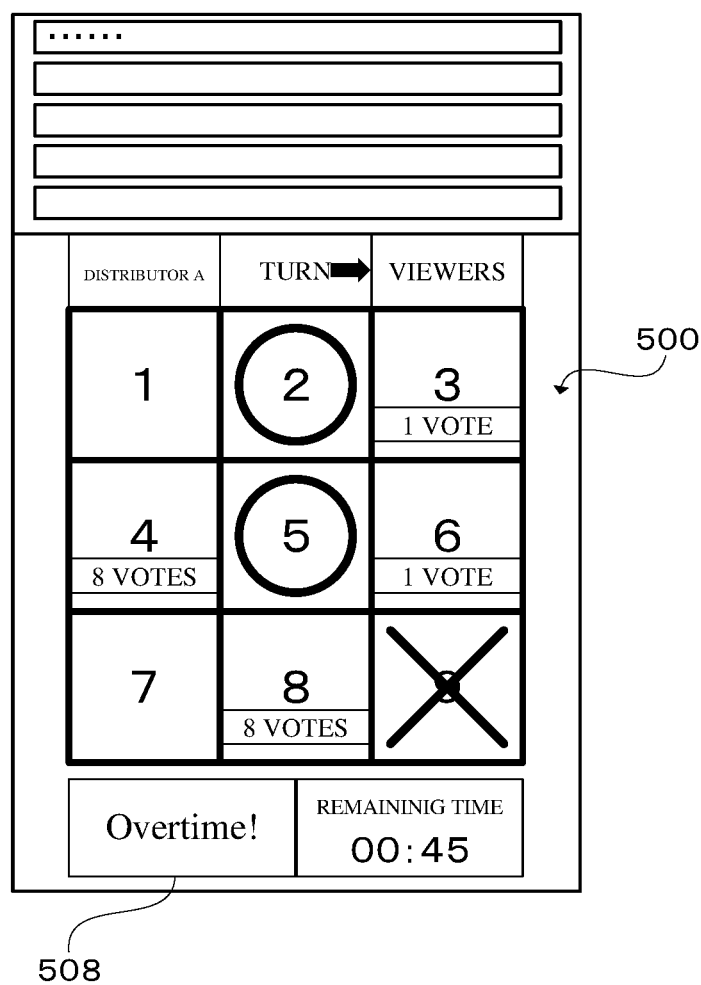
FIG. 15 is a diagram showing another example of the second video displayed in the terminal device 10 used in the video distribution system 1 shown in FIG. 1.

Next, it is considered a case where, as shown in FIG. 14, at the time when the remaining time is over in the second turn of the second time, the terminal device 10A of the distributor A has received eight pieces of token data indicative of giving the token G4 corresponding to the option of the grid 4, and has received eight pieces of token data indicative of giving the token G1 corresponding to the option of the grid 8. In this case, the terminal device 10A can display that eight votes have been cast for each of the grids 4 and 8 in the second video 500.

Additionally, in one embodiment, the token data indicative of giving the token G4 corresponding to the option of the grid 4 and the token data indicative of giving the token G1 corresponding to the option of the grid 8 may have been received by the terminal device 10A of the distributor A at any time from the end of the second turn of the previous time (see FIGS. 9, 11, and 12), via the first turn of the second time (see FIG. 13) occurring subsequently, to the execution of the second turn of the second time (see FIG. 14). In another embodiment, the token data indicative of giving the token G4 corresponding to the option of the grid 4 and the token data indicative of giving the token G1 corresponding to the option of the grid 8 may have been received by the terminal device 10A only during the execution of the second turn of the second time (see FIG. 14).

As shown in FIG. 14, at the time when the remaining time is over, there may be a plurality of options (here, the option of the grid 4 and the option of the grid 8) as an option having the maximum score. In this case, the terminal device 10A can extend the remaining time of the second turn of the second time as indicated by an object 508 "Overtime!" in FIG. 15. In one embodiment, the remaining time given to the overtime is one minute, for example.

In an overtime of the second turn of the second time, the terminal device 10A can display the total number of votes cast for each grid in the second video 500 by using the token data received for each grid (each option) regarding the overtime in addition to the token data received for each grid (each option) regarding the second turn of the second time.

Figure 16:
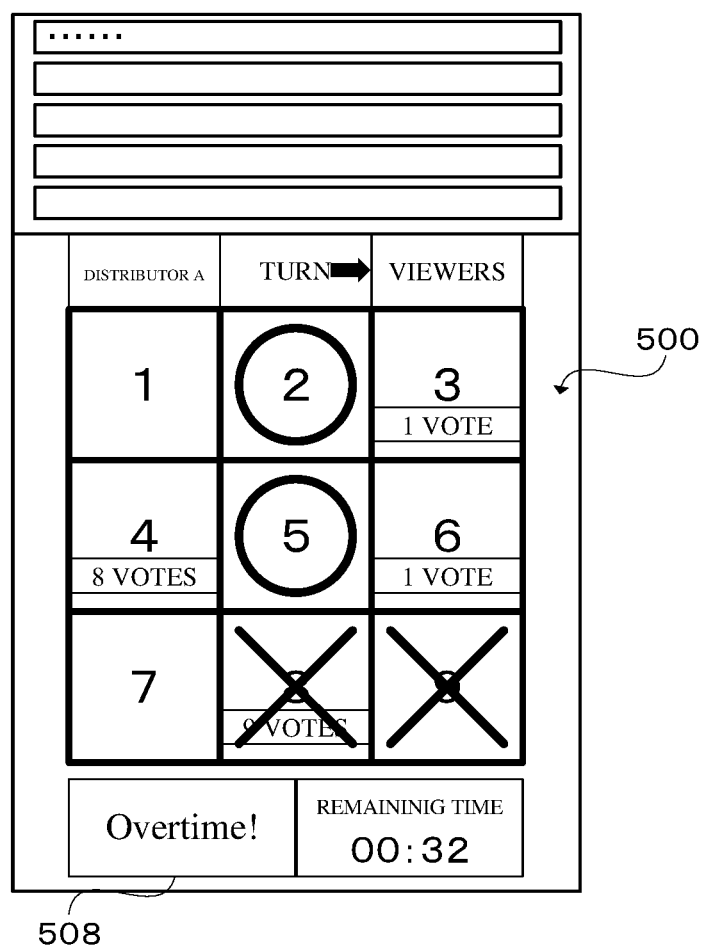
FIG. 16 is a diagram showing another example of the second video displayed in the terminal device 10 used in the video distribution system 1 shown in FIG. 1.

In an overtime, in one embodiment, the terminal device 10A ends the overtime at the time when, of the plurality of grids (the plurality of options), a grid (option) having the maximum score occurs. For example, as shown in FIG. 16, at the time when the score based on the total number (nine votes) of the given tokens G1 assigned to the option of the grid 8 becomes the maximum among all the grids (all options), the terminal device 10A can determine the option of the grid 8 as the final option of the viewer team and end the overtime. Thus, the terminal device 10A can display (control) the game object called "X" (cross) to this grid 8 on the basis of the option of the grid 8 as shown in FIG. 16.

Figure 17:
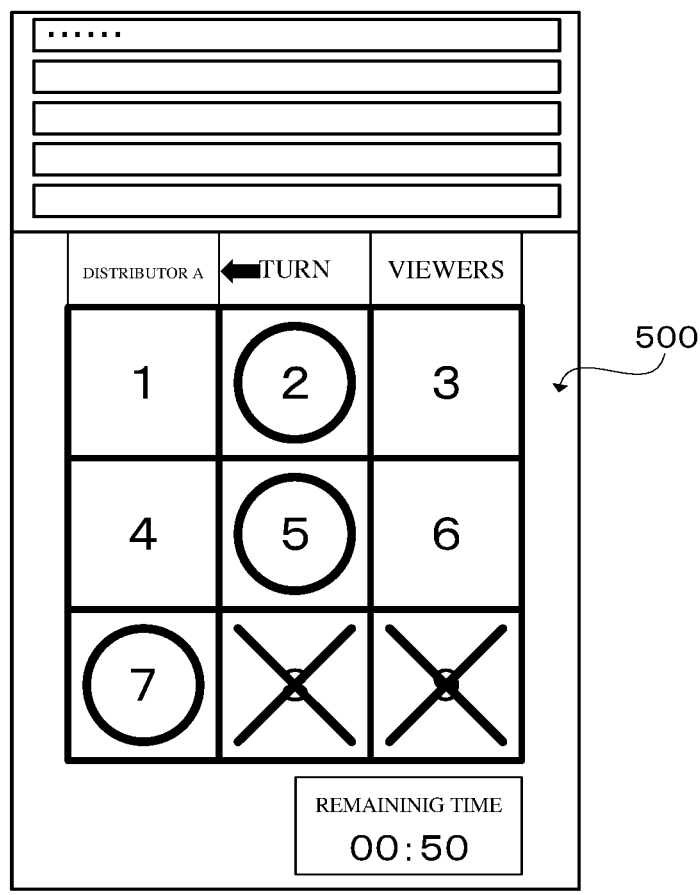
FIG. 17 is a diagram showing another example of the second video displayed in the terminal device 10 used in the video distribution system 1 shown in FIG. 1.

Next, as shown in FIG. 17, it is assumed that the distributor A selects the grid 7 in the first turn of the third time.

Figure 18:
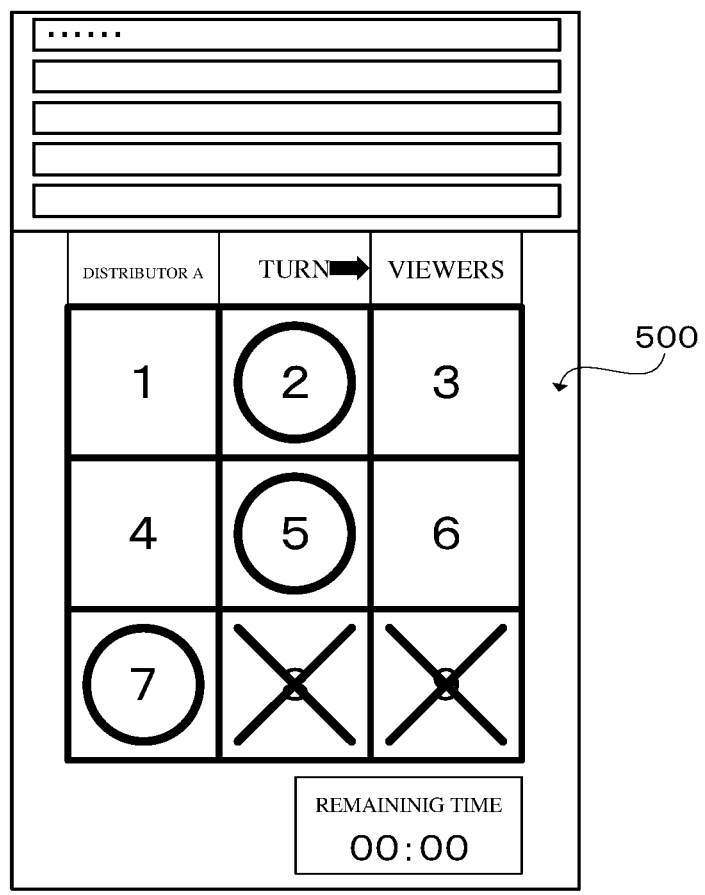
FIG. 18 is a diagram showing another example of the second video displayed in the terminal device 10 used in the video distribution system 1 shown in FIG. 1.

Next, as shown in FIG. 18, it is assumed that the terminal device 10A of the distributor A has not received any token data at the time when the remaining time is over in the second turn of the third time. Specifically, in one embodiment, it is assumed that the terminal device 10A of the distributor A has not received any new token data at any time from the end of the overtime of the second turn of the previous time (see FIG. 16), via the first turn of the third time (see FIG. 17) subsequently occurring, to the execution of the second turn of the third time (see FIG. 18). In another embodiment, it is assumed that the terminal device 10A of the distributor A has not received any new token data only during the execution of the second turn of the third time (see FIG. 18).

Figure 19:
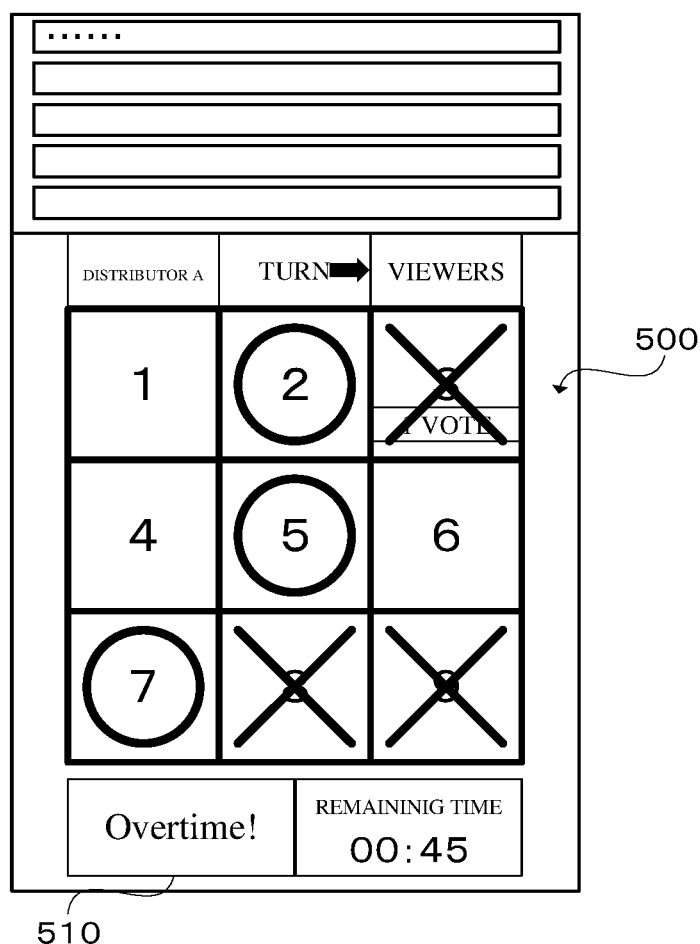
FIG. 19 is a diagram showing another example of the second video displayed in the terminal device 10 used in the video distribution system 1 shown in FIG. 1.

Also in this case, the terminal device 10A can extend the remaining time of the second turn of the third time as indicated by an object 510 "Overtime!" in FIG. 19. In one embodiment, the remaining time given to the overtime is one minute, for example.

Also in this overtime, in one embodiment, the terminal device 10A ends the overtime at the time when, of the plurality of grids (the plurality of options), a grid (option) having the maximum score occurs. For example, as shown in FIG. 19, at the time when the score based on the total number (one vote) of the given tokens G2 assigned to the option of the grid 3 becomes the maximum among all the grids (all options), the terminal device 10A can determine the option of the grid 3 as the final option of the viewer team and end the overtime. Thus, the terminal device 10A can display (control) the game object called "X" (cross) to this grid 3 on the basis of the option of the grid 3 as shown in FIG. 19.

Figure 20:
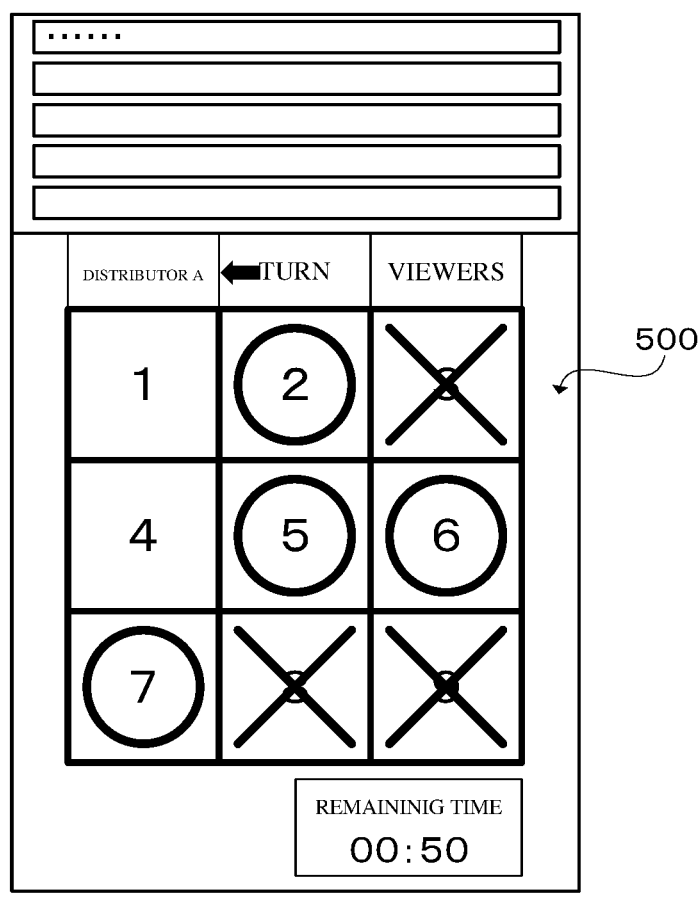
FIG. 20 is a diagram showing another example of the second video displayed in the terminal device 10 used in the video distribution system 1 shown in FIG. 1.

Next, as shown in FIG. 20, it is assumed that the distributor A selects the grid 6 in the first turn of the fourth time.

Figure 21:
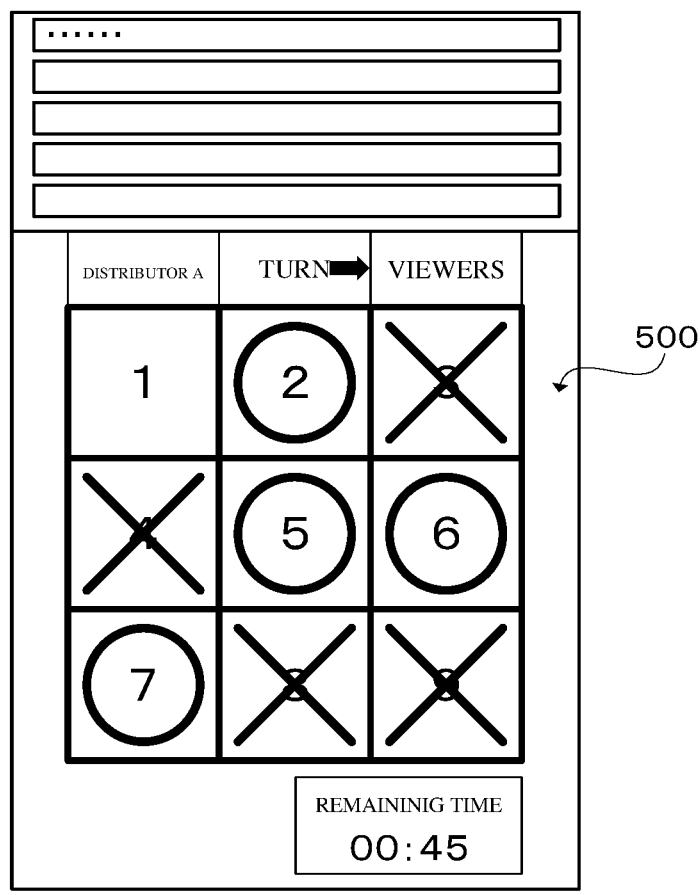
FIG. 21 is a diagram showing another example of the second video displayed in the terminal device 10 used in the video distribution system 1 shown in FIG. 1.

Next, as shown in FIG. 21, it is assumed that in the second turn of the fourth time, the operations similar to those described in relation to the second turns of the first to third times described above is performed, whereby the viewer team selects the option of the grid 4. As is clear from FIG. 21, it can be seen that neither the distributor nor the viewer team can acquire any longer three linearly continuous regions adjacent to each other in a vertical, horizontal, or diagonal direction. In this case, this game is a draw.

In order to prevent such draw from occurring, the following technology can be used in one embodiment. In a case where the distributor A and/or the viewer team cannot acquire N linearly continuous regions in a state of having acquired the total of N regions (three, here), when selecting the next region (before selection), the region acquired first of the total N regions can be lost. This lost region can be returned to a region that can be acquired again by the distributor A or the viewer team.

Figure 22:
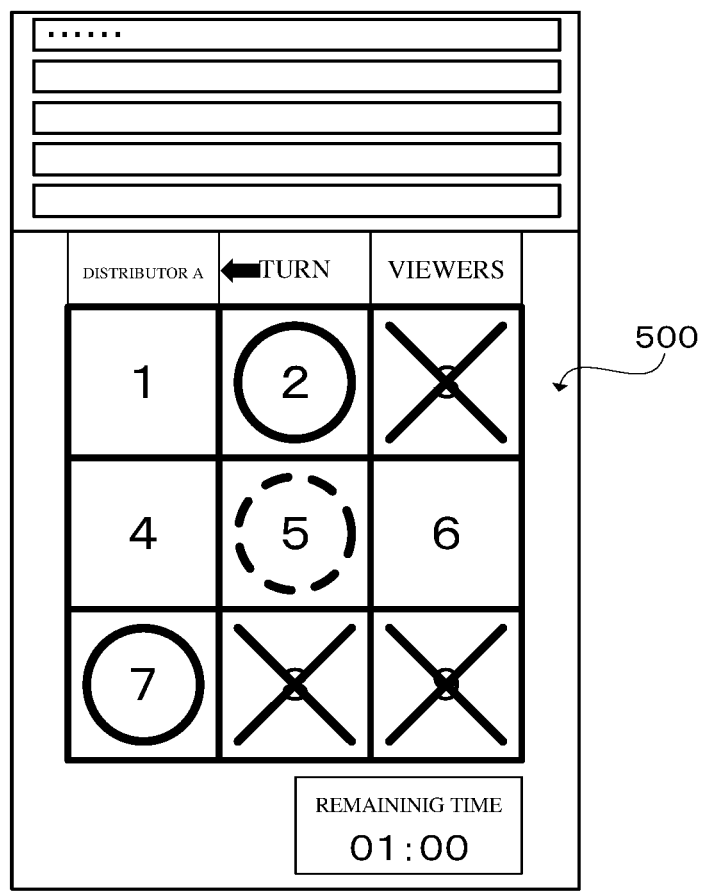
FIG. 22 is a diagram showing another example of the second video displayed in the terminal device 10 used in the video distribution system 1 shown in FIG. 1.
Figure 23:
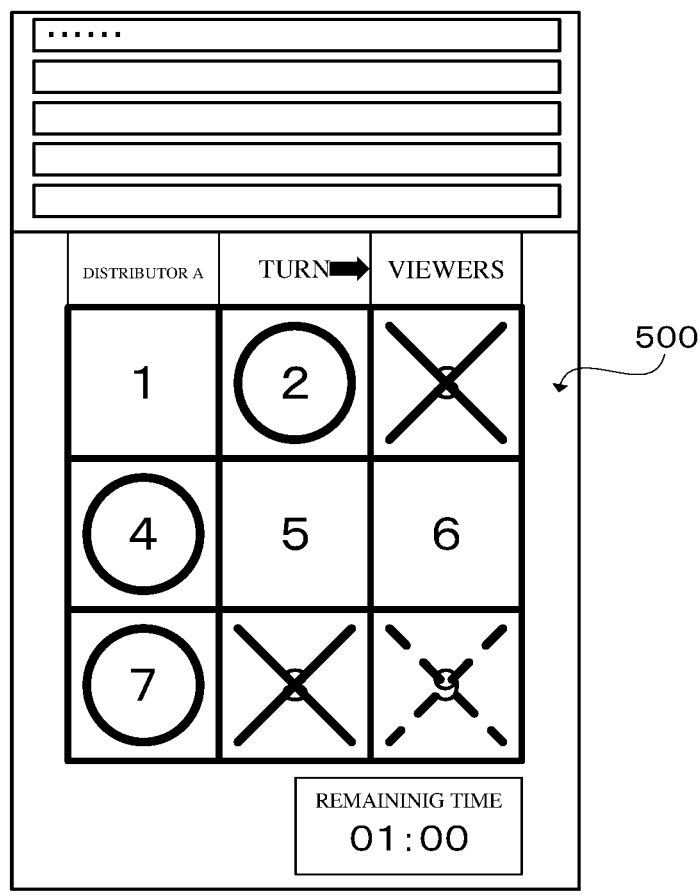
FIG. 23 is a diagram showing another example of the second video displayed in the terminal device 10 used in the video distribution system 1 shown in FIG. 1.

For example, as shown in FIG. 22 (this corresponds to the first turn previously shown with reference to FIG. 20), at the start of the first turn (remaining time is one minute), the distributor A has not acquired three linearly continuous regions in a state where the distributor A has acquired three regions. In this case, when the distributor A selects a new region in this first turn, the distributor A loses the grid 5, which is the region acquired first of the three regions already acquired. As a result, as shown in FIG. 23, in the second video 500, the object "○" is deleted from the region 5. This increases the number of grids (options) that the distributor A (and the viewer team) can select. Here, as shown in FIG. 23, it is assumed that the distributor A selects the grid 4.

Additionally, alternatively, until the distributor A selects a new grid, in the second video 500, the object "○" may be displayed in the grid 5 shown in FIG. 22, and after the distributor A selects the grid 4 as a new grid, the object "○" may be deleted from the grid 5. That is, after the distributor A selects a new region (grid 4, here) in this first turn, the distributor A may lose the grid 5, which is the region acquired first of the three regions already acquired. Thus, after the distributor A selects a new region, the region selected first is deleted, whereby the need to remember in what order the grids have been placed so far comes to the distributor A. This allows the distributor A to be further immersed in the game.

Figure 24:
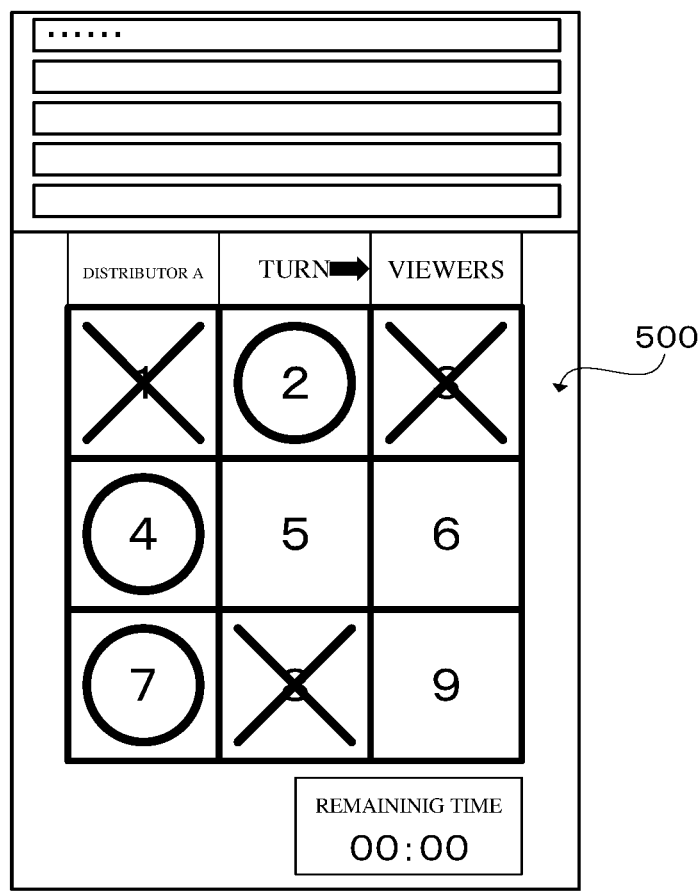
FIG. 24 is a diagram showing another example of the second video displayed in the terminal device 10 used in the video distribution system 1 shown in FIG. 1.

Next, as shown in FIG. 23, at the start of the second turn (remaining time is one minute), the viewer team has not acquired three linearly continuous regions in a state where the viewer team has acquired three regions. In this case, when the viewer team selects a new region in this second turn, the viewer team loses the grid 9, which is the region acquired first of the three regions already acquired. As a result, as shown in FIG. 23, in the second video 500, the object "X" is deleted from the region 5. This increases the number of grids (options) that the viewer team (and the distributor A) can select. After this, as shown in FIG. 24, the viewer team can select the grid 1, for example.

Use of such technology allows the distributor A and the viewer team to continue the match until the winner is determined without causing a draw.

Subsequently, after the distribution of the second video 500 ends with the end of tic-tac-toe, the terminal device 10A can display at least one piece of the following data in the first video 404 (FIG. 6 and the like).

data regarding the token given to the distributor during the distribution of the second video 500 (name of the token, the token object corresponding to the token, and/or the value of the token)

data (name, handle name, and/or avatar object) regarding each viewer who gave a token to the distributor during the distribution of the second video 500 (e.g., during the execution of tic-tac-toe)

Additionally, in the various embodiments described above, as the simplest embodiment, a case has been described in which only one type of token is assigned to each of the N grids (options). In another embodiment, each of the N grids (options) can be assigned at least one type of token (and may be a plurality of types of tokens). In this case, the terminal device 10A can calculate a score based on the number of the assigned at least one type of token given to the distributor A for each grid (each option). Subsequently, the terminal device 10A can determine, as the final option of the viewer team, the option having the maximum score of the options. Furthermore, the terminal device 10A can control the game object on the basis of the option thus determined.

In the various embodiments described above, the case has been described in which for each grid (each option), the total number of tokens assigned to the grid (options) is used as it is as the score of the grid (option). That is, the case has been described in which for each grid (each option), the total number of tokens assigned to the grid (options) that is multiplied by the coefficient 1 is used as the score of the grid (option). In another embodiment, for each grid (each option), the total number of tokens assigned to the grid (options) that is multiplied by the coefficient corresponding to the token can be used as the score of the grid (option).

For example, for a certain grid (option), if the value of the token assigned to the grid (option) is high, the total number of tokens assigned to the grid that is multiplied by a large coefficient can be used as the score of this grid. On the other hand, for a certain grid (option), if the value of the token assigned to the grid (option) is low, the total number of tokens assigned to the grid that is multiplied by a small coefficient can be used as the score of this grid. The coefficient used for a token may be proportional to the value of the token. Here, the value of a token can include, without limitation, the price of the token, the usable time of the token, and/or the number of people who can use the token at the same time. Additionally, the fact that the usable time of the token is short (or long) means that the value of the token is high (or low). The fact that the number of people who can use the token at the same time is small (or large) means that the value of the token is high (or low).

This allows each viewer viewing the second video 500 to increase his/her own influence and easily control the game itself by voting for the option to which the token of higher value is assigned among the plurality of options.

In yet another embodiment, for each grid (each option), the total number of tokens assigned to the grid (options) that is multiplied by the coefficient related to the viewer who gave the token can be used as the score of the grid (option). Specifically, for example, it is considered a case where one token G5 assigned to the grid 1 is sent by a viewer U1 to the distributor and one token G5 is sent by a viewer U2.

In this case, the total number (1) of the tokens G5 sent by the viewer U1 can be multiplied by the coefficient 1 because the level of the viewer U1 is low. On the other hand, the total number (1) of the tokens G5 sent by the viewer U2 can be multiplied by the coefficient 3 because the level of the viewer U2 is high. As a result, the score of the grid 1 can be $(1 \times 1)+(1 \times 3)=4$.

This allows each viewer to increase his/her influence on the game distributed by the distributor by raising his/her own level. Therefore, each viewer can be motivated to raise his/her level.

Additionally, the level of each viewer can be raised on the basis of at least one of the following elements, for example.

Total number of users (followers) who follow the viewer

Total number of users (followers) whom the viewer follows

Total number of points gained regarding the gifting (giving tokens) of the viewer Total number of videos distributed by the viewer as a distributor Total number of days in which the viewer continuously distributed the video as a distributor Total time in which the viewer has distributed the video as a distributor Total score acquired in the game or the like that the viewer distributed as a distributor Furthermore, in the various embodiments described above, an aspect has been described in which the following operations are performed when the condition that "The time limit set for this second turn has elapsed", which is one of the predetermined conditions, is satisfied in the turn (second turn) in which the viewer team determines the option.

- If there is one option having the maximum score among the plurality of options, this second turn is ended.
- If there are two or more options having the maximum score among the plurality of options, this second turn is continued until the only one option having the maximum score is generated (Additionally, in this case, in another embodiment, instead of continuing this second turn, the first voted option or the randomly selected option among the two or more options is determined as the final option, and this second turn is ended).

Here, the predetermined condition may include at least one of the following conditions (A) to (D).

(A) Condition that the time limit set for this second turn has elapsed
(B) Condition that the total of the scores calculated for all of the plurality of options has exceeded the threshold for this second turn
(C) Condition that the number of pieces of token data corresponding to the total number of viewers viewing the second video 500 has been received for this second turn
(D) Condition that the distributor A indicates that the reception of a vote by each viewer ends in this second turn Regarding (B), in the case where the total of the scores calculated for all of the plurality of options has exceeded the threshold for this second turn, the second turn can be ended by presuming that almost all the viewers viewing the second video have given a token to the distributor and completed the voting. Thus, it is possible to end this second turn even before the time limit set for this second turn has elapsed. As a result, it is possible to quickly finish each second turn, and to rapidly progress this tic-tac-toe.

Regarding (C), in the case where the total number of pieces of the received token data reaches the total number of the viewers who view the second video 500 for this second turn, the second turn can be ended by presuming that almost all the viewers viewing the second video have given a token to the distributor and completed the voting. Thus, it is possible to end this second turn even before the time limit set for this second turn has elapsed. As a result, it is possible to quickly finish each second turn, and to rapidly progress this tic-tac-toe. Here, the distribution server device 20a has a function of distributing the second video 500 transmitted by the terminal device 10A of the distributor A to the terminal device 10 of each viewer. Therefore, the distribution server device 20a can recognize the total number of viewers viewing this second video 500. Accordingly, the terminal device 10A of the distributor A receives data regarding the total number of the viewers viewing this second video 500 from the distribution server device 20a, thereby being capable of recognizing the total number of the viewers viewing this second video 500.

Regarding (D), for example, when the terminal device 10A of the distributor A received token data from the terminal device 10 of any viewer (any one viewer voted by giving a token), the terminal device 10A can display, for example, a "Voting reception end" button on the display unit. By tapping the button or the like, the distributor A can indicate that the reception of voting by each viewer is ended. This allows the terminal device 10A of the distributor A to generate a signal indicating that the distributor A ends reception of voting by each viewer.

Additionally, the content displayed on the terminal device 10A of the distributor A and the content displayed on the terminal device 10 of each viewer may not always match at an identical timing (time lag occurs) due to a delay that may occur in a communication network 2. In such case, adopting (A) can cause a situation in which voting by the viewer at the time when the remaining time limit is running short is not actually in time for the time limit set by the terminal device 10A of the distributor. Therefore, in view of the delay occurring in the communication network 2, it is more preferable to adopt (B), (C), and/or (D).

In the various embodiments described above, a case has been described in which the time limit (remaining time) given to the first turn, the time limit (remaining time) given to the second turn, and the time limit (remaining time) given to the overtime for each turn are one minute each. In another embodiment, the time limit given to each turn and an overtime for each turn can be any time (fixed or variable time). In addition, the time limit given to each turn and an overtime for each turn can be variable for each turn and for each overtime for each turn.

6. Variations

In the various embodiments described above, as an example, a case has been described in which the distributor and the viewer team select options in the first turn and the second turn alternately repeated respectively. However, the technology disclosed in the present application is applicable to all aspects of performing the following operations.

- Receive token data generated by the terminal device of each viewer viewing the second video, the token data indicating that any type of token among a plurality types of tokens is given to a distributor.
- Calculate, on the basis of the token data, the score based on the total number of at least one type of tokens given to the distributor.
- Control, on the basis of the score, a game object used in the game. Additionally, the control of the game object can include, without limitation thereto, for example, movement, deformation, display/hide, and enlarge/reduce game objects, and/or change of various parameters related to the game objects.

Therefore, the technology disclosed in the present application is applicable to an aspect of selecting, on the basis of the score, at least one option among a plurality of prepared options in, for example, role-playing games, simulation games, shooting games, action games, card games, Mahjong, Go, Othello games, puzzle games, quiz games, sports games, and/or board games. The plurality of prepared options can include, without limitation thereto, for example, attacks on a certain game object, various operations on a certain game object (such as activation of skills associated with a certain game object and evolution of a certain game object), various operations on cards, tiles, Go stones, and the like, and selection of answers.

In particular, the technology disclosed in the present application is applicable also to an aspect in which a game object is not attacked (parameters of the game object are not changed or the like) if the score has not reached the threshold value, and the game object is attacked (parameters of the game object are changed or the like) if the score has reached the threshold value.

In this case, the game may or may not be an aspect in which the distributor and the viewer team compete against each other, may or may not be an aspect in which the first viewer team and the second viewer team compete against each other, or may or may not be an aspect in which the distributor and the viewer team cooperate with each other.

This game may or may not be an aspect of adopting a turn system. In a case of adopting the turn system, the game may be such that a turn in which one selects an option and a turn in which the other selects an option are alternately repeated one by one, or may be such that both turns are repeated an arbitrary number of times.

In the various embodiments described above, it is also possible to adopt a method of transmitting comment data indicating comments about the distributor and/or the video from the terminal device 10 of each viewer to the terminal device 10A of the distributor via the server device 20.

Such comment data can include, for example, the following data.
Data indicating the contents of the comment
Identification data of the distributor who is a receiver of the comment data
Identification data of the viewer who is a sender of the comment data Such comment data can be transmitted from the terminal device 10 of each viewer to the server device 20. The server device 20 transmits comment data to the terminal device 10A of the distributor on the basis of identification data of the distributor included in the comment data. The terminal device 10A of the distributor can display contents based on the comment data in the field 506 illustrated in FIG. 11, for example.

Also, in the various embodiments described above, the case has been described in which the terminal device 10 of the distributor receives, from the web server device 20B, an HTML (HTML5, for example) document in which a game program is incorporated, in order to generate a video (second video) related to a game. However, in place of the configuration in which the terminal device 10 of the distributor receives, from the web server device 20B, an HTML document in which the game program is incorporated from the web server device 20B, it is also possible to generate a second video including a screen related to the game by executing an installed video distribution application and receiving necessary data from a data server device not shown (or any server device not shown included in the distribution server system 20A).

In the various embodiments described above, the terminal device 10 of the distributor may be a smartphone or the like used by a general user or may be a dedicated terminal device installed in a studio or the like. In this case, at least one server device of the distribution server device 20a, the DB server device 20b, and the game API server device 20c (furthermore, the web server device 20B) included in the distribution server system 20A may be provided together with the dedicated terminal device in the studio or the like.

Furthermore, in the various embodiments described above, a case has been described in which the terminal device 10 of the distributor generates a video including animation including an avatar object of the distributor on the basis of motion data related to the motion of the distributor and voice data related to the voice of the distributor, and transmits the video to the server device 20. However, the terminal device 10 of the distributor may transmit motion data related to the motion of the distributor and voice data related to the voice of the distributor to the server device 20, and the server device 20 may generate a video on the basis of the motion data and the voice data and distribute the video to the terminal device 10 of each viewer. This can reduce the amount of data transmitted from the terminal device 10 of the distributor to the server device 20.

Alternatively, the terminal device 10 of the distributor may transmit motion data related to the motion of the distributor and voice data related to the voice of the distributor to a separately provided server device, and this separate server device may generate a video on the basis of the motion data and the voice data and return it to the terminal device 10 of the distributor, and the terminal device 10 of the distributor may transmit the received video to the server device 20. This can reduce the amount of data transmitted from the terminal device 10 of the distributor to the separately provided server device.

Furthermore, the terminal device 10 of the distributor may transmit motion data related to the motion of the distributor and voice data related to the voice of the distributor to the terminal device 10 of each viewer via the server device 20 or the separately provided server device, and the terminal device 10 of each viewer may generate (render) and display a video on the basis of the received motion data and the voice data. This can reduce the amount of data transmitted from the server device 20 or the separately provided server device to the terminal device 10 of each viewer.

In any of the above cases, generation of a video on the basis of the motion data and the audio data transmitted by the terminal device 10 of the distributor may be shared by at least two devices among the server device 20, the separate server device, and the terminal device 10 of each viewer. In any case, the device responsible for generating the video can receive, from, for example, the server device 20, and store data (images and the like) regarding the avatar object to be moved.

Furthermore, in any case, the token data and/or comment data transmitted by the terminal device 10 of each viewer can be transmitted by any method to a device responsible for generating a video, among the server device 20, the separate server device, and the terminal device 10 of each viewer. This allows the device that generates the video to execute processing (e.g., displaying a token object on a video) based on the received token data, and/or to execute processing (e.g., displaying a comment on a video) based on the received comment data. In any case, the device responsible for generating the video can receive, from, for example, the server device 20 or the like, and store data (images and the like) corresponding to various tokens to be used.

In the various embodiments described above, the operations of each terminal device 10 described above are also executable similarly by the studio unit 30 having the similar configuration to that of this terminal device 10. In this case, the studio unit 30A illustrated in FIG. 1 can have the similar functions to those of the terminal device 10 for distributing videos. Similarly, the studio unit 30B illustrated in FIG. 1 can have the similar functions to those of the terminal device 10 for viewing videos. Furthermore, the operations of each server device 20 described above are also executable by the studio unit 30 having the similar configuration to those of this server device 20.

As will be readily understood to a person of ordinary skill in the art having the benefit of the present disclosure, the various examples described above can be used in various suitable combinations with each other as long as they do not cause inconsistencies.

In general, when a game program is installed in the terminal device 10, or when the game program is incorporated in a video distribution application installed in the terminal device 10, in order to execute a new game, one installs, in the terminal device 10, a new game program or a video distribution application incorporating the new game program. In this case, the game program creator prepares a game program corresponding to each of the plurality of OSs, and hence there is a problem that the man-hour required for the production of the game program increases. On the other hand, from the viewpoint of the user, since it is necessary to download a new game program and/or update an existing game program in order to obtain a new game, there is a problem that communication load, communication cost, time and labor are required.

On the other hand, according to the technology disclosed in the present application, in order to execute a game, the terminal device 10A of the distributor can call a browser function incorporated in the video distribution application instead of executing the game program installed in the terminal device 10A, can receive a web page (HTML documents, especially HTML5 documents) from the web server device 20B by using the browser function, and can execute the game program incorporated in the web page. This allows the terminal device 10A of the distributor to easily execute a new game. Therefore, when providing a new game, the game program creator only needs to incorporate the new game program into the web page (HTML documents, especially HTML5 documents) transmitted by the web server device 20B, and hence the man-hours required for the creation of the new game program can be reduced. Since the user does not need to download a new game program or the like in order to receive a new game, the communication load, communication cost, time and labor can be suppressed.

Furthermore, according to the technology disclosed in the present application, when each viewer who views the second video 500 sends token data to the distributor, the terminal device 10A of the distributor can control the game object used in the game in accordance with the score based on the total number of pieces of token data received from the terminal device 10 of each viewer. Thus, by sending the token data to the distributor, each viewer can influence the success or failure of the game played by the distributor, and hence each viewer can obtain the actual feeling of participation in the game.

Thus, the technology disclosed in the present application can provide a computer program, a method, and a server device that can give a viewer a feeling of participation in the game.

In the various embodiments described above, when executing the video distribution application and communicating with the distribution server system 20A to distribute the first video, the terminal device 10A of the distributor A executes the browser function incorporated in the video distribution application, whereby the terminal device 10A can execute a program included in the web page received from the web server device 20B and distribute the second video to the terminal device 10 of each viewer via the distribution server system 20A. However, such configuration is merely an example.

For example, the terminal device 10A of the distributor A can also distribute the second video without distributing the first video. Specifically, in the first example, by executing the video distribution application and executing the browser function incorporated in the video distribution application, the terminal device 10A of the distributor A can execute a program included in the web page received from the web server device 20B (without distributing the first video by using the video distribution application), and distribute the second video to the terminal device 10 of each viewer via the distribution server system 20A. With this configuration, it is possible for the distributor A not to distribute the first video based on the performance of himself/herself but to distribute only the second video showing the state of the game executed by himself/herself.

In the second example, by executing an installed game application and accessing the distribution server system 20A, which also functions as a game server device, the terminal device 10A of the distributor A can distribute the screen of the game being executed to the terminal device 10 of each viewer via the distribution server system 20A.

In the third example, the terminal device 10A of the distributor A can transmit operation data of the distributor A to the web server device 20B or the distribution server system 20A without generating a game screen in the above-mentioned first example or the second example. In this case, the web server device 20B or the distribution server system 20A can generate a game screen by using the operation data of the distributor, and the distribution server system 20A can distribute the second video including the generated game screen to the terminal device 10 of each viewer.

Since the distribution server system 20A holds token data and/or comment data transmitted from each viewer to the distributor, the second video can be generated by using token data and/or comment data and the operation data by a technique similar to that performed by the terminal device 10 of the distributor. On the other hand, the web server device 20B does not hold token data and/or comment data transmitted from each viewer to the distributor. Therefore, the web server device 20B can acquire token data and/or comment data held by the distribution server system 20A from the distribution server system 20A, and can generate a second video by using this token data and/or comment data and the operation data. The web server device 20B can receive token data and/or comment data from the distribution server system 20A by using the above-described method performed by the terminal device 10 of the distributor with the distribution server system 20A.

The method of generating the second video by the web server device 20B or the distribution server system 20A can be the same as the method of generating the second video described above by the terminal device 10 of the distributor.

7. Example Computing Environment

Figure 25:
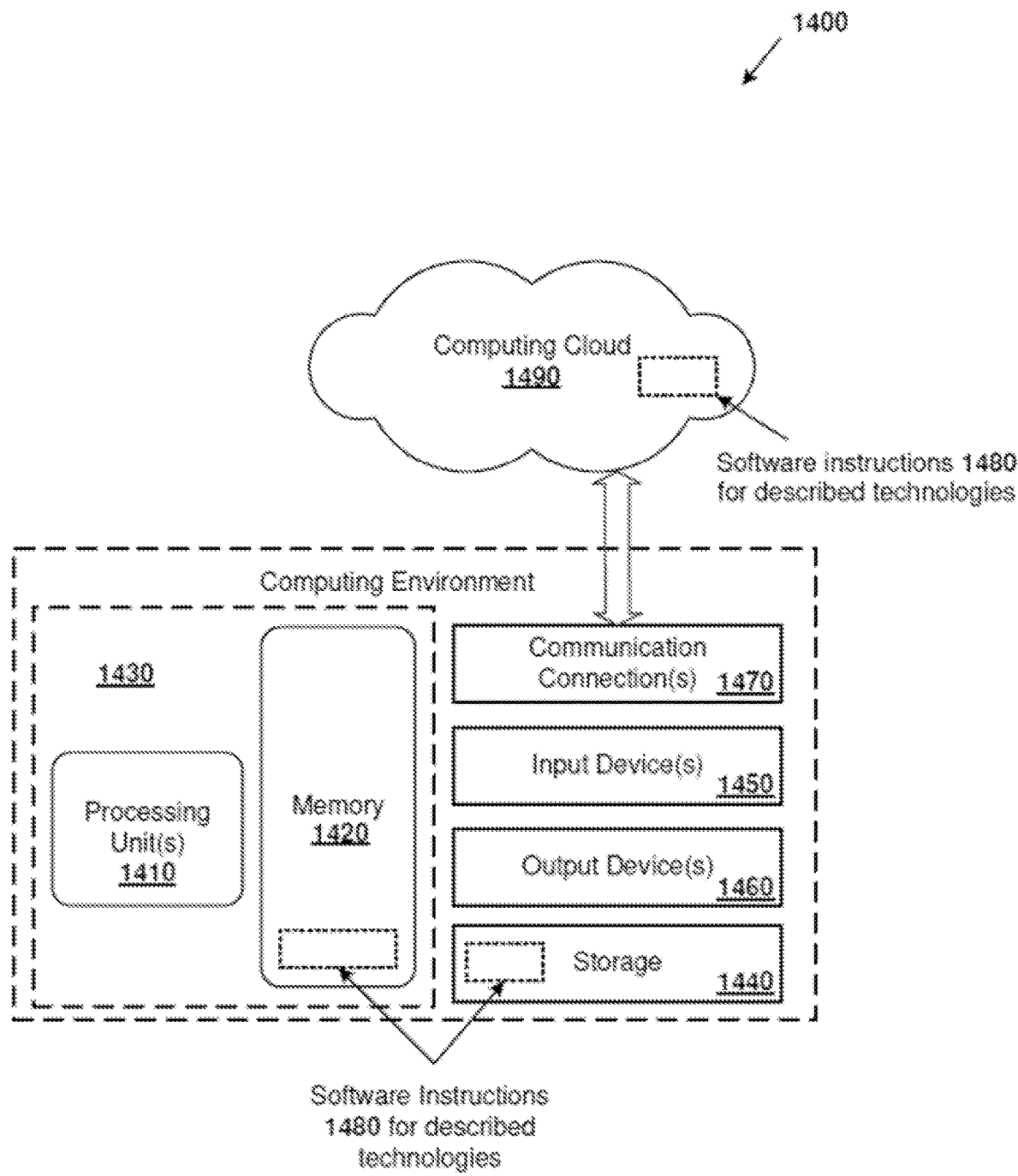
FIG. 25 illustrates a generalized example of a suitable computing environment 1400 in which described embodiments, techniques, and technologies, including transmitting and using tokens to render video in a computing environment, can be implemented.

FIG. 25 illustrates a generalized example of a suitable computing environment 1400 in which described embodiments, techniques, and technologies, including transmitting and using tokens to render video in a computing environment, can be implemented. For example, the computing environment 1400 can implement any of the terminal devices (or distributors or viewers) or the distribution server system, etc., as described herein.

The computing environment 1400 is not intended to suggest any limitation as to scope of use or functionality of the technology, as the technology may be implemented in diverse general-purpose or special-purpose computing environments. For example, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 25, the computing environment 1400 includes at least one central processing unit 1410 and memory 1420. In FIG. 25, this most basic configuration 1430 is included within a dashed line. The central processing unit 1410 executes computer-executable instructions and may be a real or a virtual processor. In a multi-processing system, multiple processing units execute computer-executable instructions to increase processing power and as such, multiple processors can be running simultaneously. The memory 1420 may be volatile memory (e.g., registers, cache, RAM), non-volatile memory (e.g., ROM, EEPROM, flash memory, etc.), or some combination of the two. The memory 1420 stores software 1480, images, and video that can, for example, implement the technologies described herein. A computing environment may have additional features. For example, the computing environment 1400 includes storage 1440, one or more input devices 1450, one or more output devices 1460, and one or more communication connections 1470. An interconnection mechanism (not shown) such as a bus, a controller, or a network, interconnects the components of the computing environment 1400. Typically, operating system software (not shown) provides an operating environment for other software executing in the computing environment 1400, and coordinates activities of the components of the computing environment 1400.

The storage 1440 may be removable or non-removable, and includes magnetic disks, magnetic tapes or cassettes, CD-ROMs, CD-RWs, DVDs, or any other medium which can be used to store data and that can be accessed within the computing environment 1400. The storage 1440 stores instructions for the software 1480, plugin data, and messages, which can be used to implement technologies described herein.

The input device(s) 1450 may be a touch input device, such as a keyboard, keypad, mouse, touch screen display, pen, or trackball, a voice input device, a scanning device, or another device, that provides input to the computing environment 1400. For audio, the input device(s) 1450 may be a sound card or similar device that accepts audio input in analog or digital form, or a CD-ROM reader that provides audio samples to the computing environment 1400. The output device(s) 1460 may be a display, printer, speaker, CD-writer, or another device that provides output from the computing environment 1400.

The communication connection(s) 1470 enable communication over a communication medium (e.g., a connecting network) to another computing entity. The communication medium conveys information such as computer-executable instructions, compressed graphics information, video, or other data in a modulated data signal. The communication connection(s) 1470 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed servers and terminal devices. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1490. For example, terminals can be deployed in the computing environment while distributor services can be performed on servers located in the computing cloud 1490.

Computer-readable media are any available media that can be accessed within a computing environment 1400. By way of example, and not limitation, with the computing environment 1400, computer-readable media include memory 1420 and/or storage 1440. As should be readily understood, the term computer-readable storage media includes the media for data storage such as memory 1420 and storage 1440, and not transmission media such as modulated data signals.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

What is claimed is:

1. Non-transitory computer-readable storage media storing computer-readable instructions, which when executed by a computer having at least one processor, cause the computer to:
   distribute, toward terminal devices of a plurality of viewers via a communication line, motion data or a first video including an animation of an avatar of a distributor generated on the basis of the motion data;
   distribute, toward the terminal devices of the plurality of viewers via the communication line, a second video related to a computer-implemented game generated on the basis of operation data by using a received web page;
   receive, via the communication line, token data indicating that any type of token among a plurality types of tokens is given to the distributor, the token data being generated by the terminal device of each of the plurality of viewers viewing the second video, the distributor competing against a viewer team comprising the plurality of viewers in the game;
   calculate a score based on the total number of at least one type of tokens given to the distributor using the token data; and
   control a game object used in the game on the basis of the calculated score.

2. The non-transitory computer-readable storage media according to claim 1, wherein the instructions further cause the computer to:
   assign at least one type of tokens to at least one option used in the game;
   calculate, for each option of the at least one option, a score based on the total number of the at least one type of tokens assigned to the option given to the distributor using the token data; and
   control the game object on the basis of an option having a maximum score among the at least one option.

3. The non-transitory computer-readable storage media according to claim 2, wherein the instructions further cause the computer to:
   execute a first turn in which an option is selected on the basis of the operation data and a second turn in which options are selected on the basis of the token data generated by the terminal device of each viewer in the game; and
   select the option having the maximum score.

4. The non-transitory computer-readable storage media according to claim 3, wherein the instructions further cause the computer to, when at least one predetermined condition is satisfied in the second turn:
   finish the second turn in the case where one option having a maximum score exists; and
   continue the second turn until one option having a maximum score exists in the case where a plurality of options having a maximum score.

5. The non-transitory computer-readable storage media according to claim 4, wherein the at least one predetermined condition includes at least one of the following:
- a condition that a time limit set for the second turn has elapsed;
- a condition that a total of the scores calculated for all of the plurality of options has exceeded a threshold in the second turn;
- a condition that the number of token data corresponding to the total number of viewers viewing the second video has been received in the second turn; or
- a condition that the data indicating that the distributor ends a reception of a vote by each viewer have been generated in the second turn.

6. The non-transitory computer-readable storage media according to claim 5, wherein the time limit is fixed or variable.

7. The non-transitory computer-readable storage media according to claim 3, wherein the instructions further cause the computer to execute the first and second turns alternately.

8. The non-transitory computer-readable storage media according to claim 7, wherein the instructions further cause the computer to select the option having the maximum score on the basis of the token data received at any time from the end of the second turn of the previous time, via the first turn occurring after the second turn, to the execution of the second turn of the next time.

9. The non-transitory computer-readable storage media according to claim 2, wherein the instructions further cause the computer to:
- calculate the score for each option by multiplying the total number by a first coefficient in the case where the at least one type of token assigned to the option is of low value; and
- calculate the score for the option by multiplying the total number by a second coefficient larger than the first coefficient in the case where the at least one type of token assigned to the option is of high value.

10. The non-transitory computer-readable storage media according to claim 2, wherein the game is configured to:
- use (N×N) grids as the plurality of options wherein N is a natural number that is three or more;
- acquire, as a region of the plurality of viewers, a grid corresponding to the option having the maximum score among the grids in the second turn repeated alternately with the first turn;
- acquire, as a region of the distributor, a grid selected on the basis of the operation data in the first turn; and
- determine, as a winner, among the distributor and the plurality of viewers, a user or users who have acquired N linearly continuous regions adjacent to one another in a vertical, horizontal, or diagonal direction.

11. The non-transitory computer-readable storage media according to claim 10, wherein in a case where the plurality of viewers or the distributor cannot acquire N linearly continuous regions in a state of having acquired a total of N regions, when or after a next region is selected, the region acquired first of the total N regions is lost and returned to a region that can be acquired again by the distributor or the plurality of viewers.

12. The non-transitory The computer-readable storage media according to claim 1, wherein the instructions further cause the computer to display, in the first video after the end of the game, a token object corresponding to each token given to the distributor during the execution of the game.

13. The non-transitory computer-readable storage media according to claim 1, wherein the second video shows the computer-implemented game.

14. A computer-implemented method for automatically generating customized video in an interactive network application, the method comprising:
with at least one processor:
- distributing, toward terminal devices of a plurality of viewers via a communication line, motion data or a first video including an animation of an avatar of a distributor generated on the basis of the motion data;
- distributing, toward the terminal devices of the plurality of viewers via the communication line, a second video related to a computer-implemented game generated on the basis of operation data by using a received web page;
- receiving, via the communication line, token data indicating that any type of token among a plurality types of tokens is given to the distributor, the token data being generated by the terminal device of each of the plurality of viewers viewing the second video, the distributor competing against a viewer team comprising the plurality of viewers in the game;
- calculating a score based on the total number of at least one type of tokens given to the distributor using the token data; and
- controlling a game object used in the game on the basis of the calculated score.

15. The computer-implemented method of claim 14, further comprising:
- assigning at least one type of tokens to at least one option used in the game;
- calculating, for each option of the at least one option, a score based on the total number of the at least one type of tokens assigned to the option given to the distributor using the token data; and
- controlling the game object on the basis of an option having a maximum score among the at least one option.

16. The computer-implemented method of claim 14, further comprising:
- displaying, in the first video after the end of the game, a token object corresponding to each token given to the distributor during the execution of the game.

17. The computer-implemented method of claim 14, further comprising:
- storing, in a computer-readable storage medium, a token object corresponding to each token given to the distributor during the execution of the game.

18. The computer-implemented method of claim 14, further comprising:
- when the calculated score exceeds a predetermined threshold, ending a turn associated with the score before a predetermined time limit has elapsed.

19. A terminal device, comprising:
at least one processor, wherein the at least one processor is configured to:
- distribute, toward terminal devices of a plurality of viewers via a communication line, motion data or a first video including an animation of an avatar of a distributor generated on the basis of the motion data;
- distribute, toward the terminal devices of the plurality of viewers via the communication line, a second video related to a computer-implemented game generated on the basis of operation data by using a received web page;
- receive, via the communication line, gift data indicating that any type of gift among a plurality types of gifts is given to the distributor, the gift data being generated by the terminal device of each of the plurality of viewers viewing the second video, the distributor competing against a viewer team comprising the plurality of viewers in the game;

calculate a score based on the total number of at least one type of gifts given to the distributor using the gift data; and control a game object used in the game on the basis of the calculated score.

20. A system, comprising:

a server device coupled to the terminal device of claim 19 via the communication line, the server device being configured to produce the first video that is distributed toward the terminal devices of the plurality of viewers.

21. The system of claim 20, further comprising:

a game application programming interface (API) server device configured to service inquiries from the terminal device regarding presence or absence of the gift data.

* * * * *